United States Patent [19]

Mitaka et al.

[11] Patent Number: 5,546,476
[45] Date of Patent: Aug. 13, 1996

[54] SHAPE RECOGNITION PROCESS

[75] Inventors: Ryosuke Mitaka; Yoshimasa Fujiwara; Hiroyuki Ikebuchi, all of Kadoma, Japan

[73] Assignee: Matsushita Electric Works, Ltd., Osaka, Japan

[21] Appl. No.: 242,669

[22] Filed: May 13, 1994

[30] Foreign Application Priority Data

May 26, 1993 [JP] Japan ................... 5-124508
Jan. 26, 1994 [JP] Japan ................... 6-006842

[51] Int. Cl.$^6$ .............. G06K 9/46; G06K 9/50; G06K 9/68
[52] U.S. Cl. .............. 382/201; 382/202; 382/203; 382/218
[58] Field of Search .............. 382/22, 34, 25, 382/201, 202, 203, 218, 258, 281, 197

[56] References Cited

U.S. PATENT DOCUMENTS

| | | | |
|---|---|---|---|
| 3,979,722 | 9/1976 | Sakoe | 382/215 |
| 4,015,239 | 3/1977 | Fujimoto et al. | 382/202 |
| 4,891,762 | 2/1990 | Chotiros | 364/456 |
| 5,065,439 | 11/1991 | Takasaki et al. | 382/241 |
| 5,220,621 | 6/1993 | Saitoh | 382/22 |

FOREIGN PATENT DOCUMENTS

| | | | |
|---|---|---|---|
| 1-161487 | 6/1989 | Japan | G06F 15/70 |
| 3-172978 | 7/1991 | Japan | G06F 15/70 |

OTHER PUBLICATIONS

Article: IEEE Computer Society (1976), "Inexact pattern Machining," L. G. Shapiro, pp. 759–763.

Primary Examiner—Jose L. Couso
Assistant Examiner—Matthew C. Bella
Attorney, Agent, or Firm—Burns, Doane, Swecker & Mathis, L.L.P.

[57] ABSTRACT

The identity of an object is determined by obtaining an image of the objective shape (e.g., by a camera), obtaining from that image an optimum objective shape representative of the object, and comparing the optimum objective shape with a known shape model of the object. The shape model is represented as a plurality of nodal points interconnected by line segments. The optimum objective shape is selected from a number of objective shapes each comprised of a row of dots having the same number of nodal points as the shape model. Each objective shape is compared with the shape model on the basis of (i) the proximity of the dots of the objective shape to the line segments of the shape model, (ii) the length of the dot segments with respect to the lengths of respective line segments, and (iii) the inclinations of the dot segments with respect to the inclinations of the line segments. The objective shape having the closest similarity to (i.e. smallest deviation from) the shape model is selected as the optimum objective shape to be compared with the shape model for identifying the object.

36 Claims, 34 Drawing Sheets

1

SHAPE RECOGNITION PROCESS

BACKGROUND OF THE INVENTION

This invention relates to a shape recognition process for recognizing an object by obtaining an objective shape representative of the object and comparing the objective shape with a known shape model.

DESCRIPTION OF RELATED ART

Generally, in forming a corner joint with a pair of iron plates or the like plate members welded together, it is required to meter any step or gap formed between joint edges of the plate members. It has been suggested to utilize a picture processing employing an optical shearing in performing such dimensional and positional metering the optical shearing. The optical shearing produces a line graph representing a sectioned shape along the objective surface. It then becomes necessary to recognize whether the line graph is as it should be, i.e., whether the corner joint represented by the line graph is of acceptable quality.

For the method for recognizing the shape of the line graph, there has been suggested such pattern matching method as has been disclosed in Japanese Patent Laid-Open Publication No. 1-161487, in which there is employed as a standard (reference) a shape model for being compared with the line graph each comprised of a combination of segments. The shape model and line graph of the objective surface are compared with respect to (a) the relative positions of the segments, (b) their length, (c) their gradient with respect to a reference line, (d) the degree of parallel between the respective segments, and so on within a two dimensional plane, and the segments mutually matching are successively detected.

In this method, a mutual collation of the segments is carried out by means of a binary judgment as to whether or not a detected difference in each respective feature is within a set tolerance. In this type of the collation method, however, it is required to set the tolerance as small as possible for the purpose of securing a high recognition accuracy, and there arises a problem that the method is not well suited to the case where the feature of the objective shape possesses a relatively large fluctuation.

As a measure for solving the above problem, there has been suggested in Japanese Patent Laid-Open Publication No. 3-172978 a method for judging whether the objective shape matches the shape model by enlarging and reducing the shape model while repeatedly collating the objective shape with the shape model.

Further, U.S. Pat. Nos. 3,979,722, 4,015,239 and 5,065,439, for example, disclose inventions relating to the shape recognition, but they still remain at the same technical level as that of the foregoing known arts, and the same problems have been left unsolved.

In the method wherein the collation of the shape model with the objective shape is carried out while enlarging and reducing the model, on the other hand, a problem arises in the case where the fluctuation in the feature is substantial when employing the optical shearing method, e.g. when the input data of the objective shape are successively provided over time, such that a collating frequency between the objective shape and the shape model increases to result eventually in an increase in the required processing time. Further, this method is not applicable to a case where the objective shape includes partial fluctuation.

SUMMARY OF THE INVENTION

Accordingly, a primary object of the present invention is to eliminate the foregoing problems, and thus to provide a shape recognition process in which the collation can be performed without changing the shape model even in an event where inputs of the objective shape are successively provided over time and the objective shape involves a significant fluctuation in respective objects.

According to the present invention, the above object of the present invention can be realized by means of a shape recognition process in which an objective shape is compared with a geometrical shape model, the method comprising the steps of representing the shape model as a set of a limited number of nodal points and line elements interconnecting respective nodal points, representing the objective shape as a dot row on a two dimensional plane, setting both a standard value and a tolerance with respect to respective features of each line segment, and evaluating the degree of coincidence of the objective shape with the shape model on the basis of (i) any difference of the dot row from the standard value, and (ii) in the relationship of that difference to the tolerance.

Since the objective shape is represented as a dot row, and the shape model as a set of a limited number of nodal points and line elements in order to set the standard value and tolerance, and since the degree of coincidence of the objective shape with the shape model is evaluated on the basis of the difference of the objective shape from the standard and the relationship of that difference to the tolerance, it should be appreciated that, so long as the degree of coincidence is judged to be high within the set tolerance, any fluctuation component in the feature of the objective shape which fluctuates to some extent can be absorbed.

Other objects and advantage of the present invention shall become clear from the following with reference to accompanying drawings.

While the present invention shall now be described in detail with reference to the number of embodiments shown in the accompanying drawings, it will be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Figure 1:
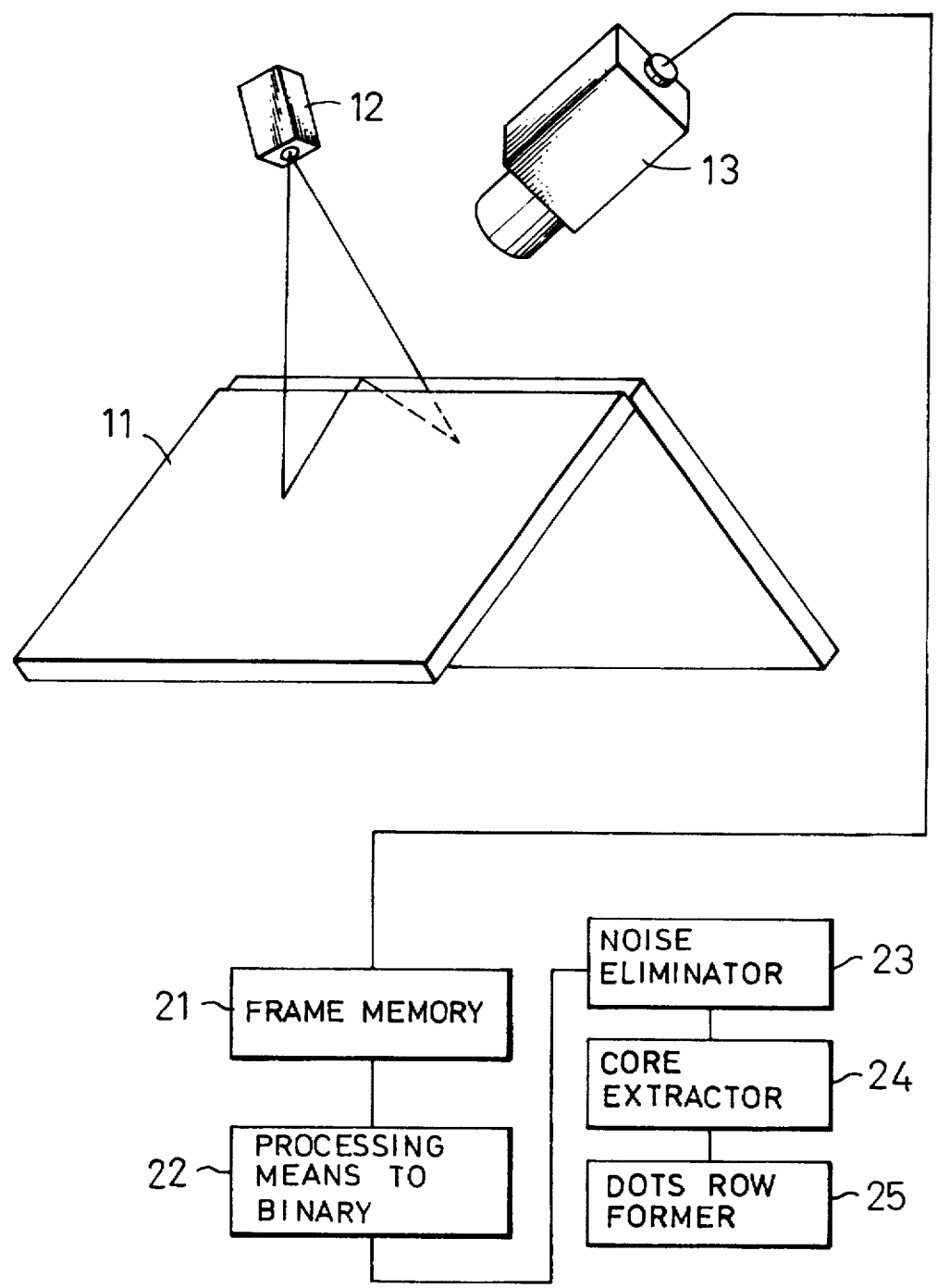
FIG. 1 is a schematic explanatory view of a device for realizing the shape recognition process according to the present invention.

One of the various embodiments according to the present invention, shown in FIGS. 1 through 9, relates to a measurement involving optical shearing in connection with a corner joint in which a pair of plate members are butted edgewise substantially at right angles to each other. In an optical shearing step, as shown in FIG. 1, a slit-shaped light is projected from a light source 12 onto an object 11 in the form of the right angle corner joint at its apex. An image of a projected light pattern of the slit-shaped light is taken by image pick-up means 13 such as a CCD camera in a direction different from that in which the slit-shaped light is projected, and the image picked up by the image pick-up means 13 is subjected to processing forming a row of dots corresponding to a shape of the object 11 extracted. That is, positions of respective measuring points on a line of intersection of the slit-shaped light with respect to a sectional plane through the apex of the object 11 are represented by coordinates in a two dimensional plane.

Figure 6B:
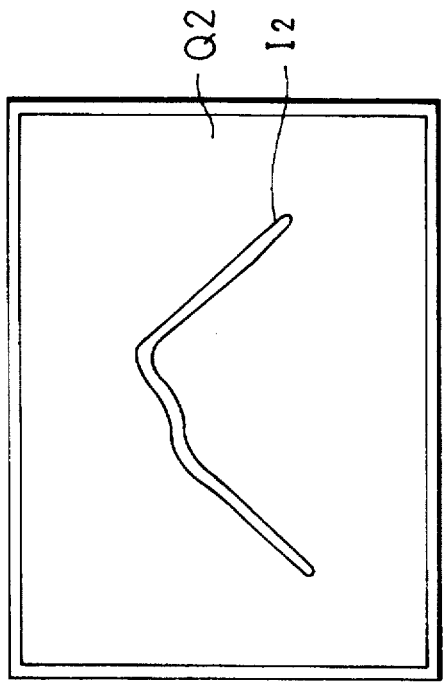
FIGS. 6a to 6d are diagrams showing a process of obtaining the dot row with the device shown in FIG. 1.
Figure 6D:
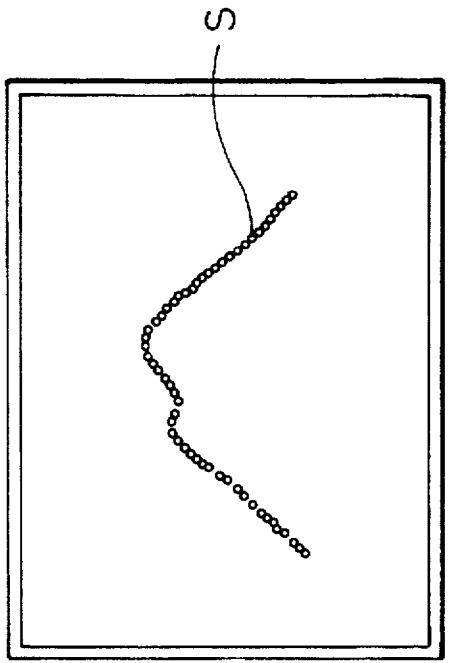
Figure 6A:
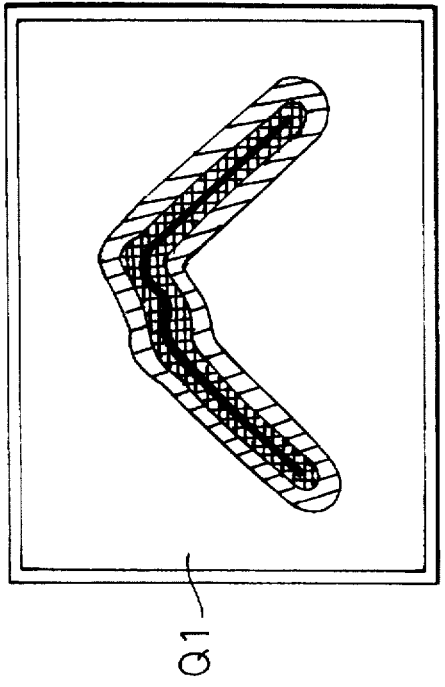
Figure 6C:
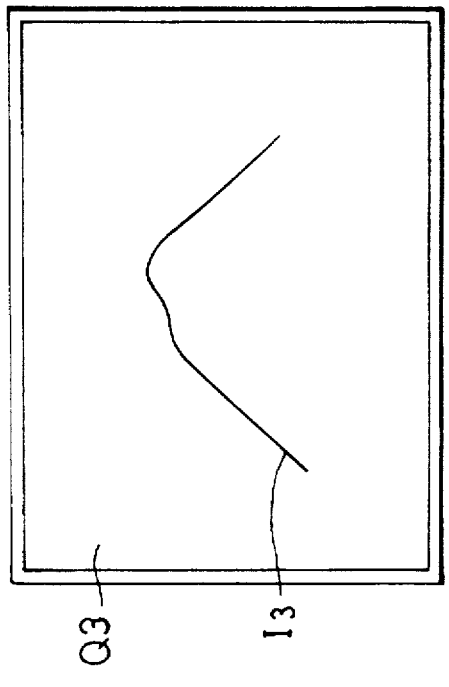

A light-and-shade picture image $Q_1$ picked up by the image pick-up means 13 (FIG. 6a) is stored in a frame memory 21. The thus stored picture image $Q_1$ is input into a binary-coding processing means 22, where the concentration of respective picture elements is compared properly with a threshold value and is binary coded, and such binary picture image $Q_2$ as shown in FIG. 6b is obtained. Then, a noise component in this binary picture image $Q_2$ is removed by a noise eliminator 23. Here, since it is normal that a line graph $l_2$ obtained with the binary picture image $Q_2$ has a width comprised of a plurality of picture elements, a center line (core) of the line graph $I_2$ in the binary picture image $Q_2$ is extracted by a core extractor 24, to provide a linear picture image $Q_3$ constituted by data of a line graph $I_3$ having a width of one picture element as shown in FIG. 6c. The line graph $I_3$ is a row of picture elements having the width of one picture element, and a dot row former 25 forms a dot row reflecting the shape at the apex of the object 11. In the dot row former 5, positional data of the dot row are obtained by sequentially arranging positional coordinates of the respective picture elements of the line graph $I_3$, from the left side of the image screen in its horizontal direction. Here, while the whole group of picture elements of the line graph $I_3$ is referred to as the dot row, it may be possible to obtain the positional coordinates of a plurality of picture elements in the horizontal direction of the screen, or to establish a representative value of a plurality of picture elements to serve as the positional coordinates, whereby the resolution may be lowered. In this way, it is possible to obtain a dot row S as shown in FIG. 6d from the line graph $I_3$. This dot row S is a sequential array of the picture elements along the abscissa of the picture image, and is utilized for processing after being stored in the memory.

Figure 7A:
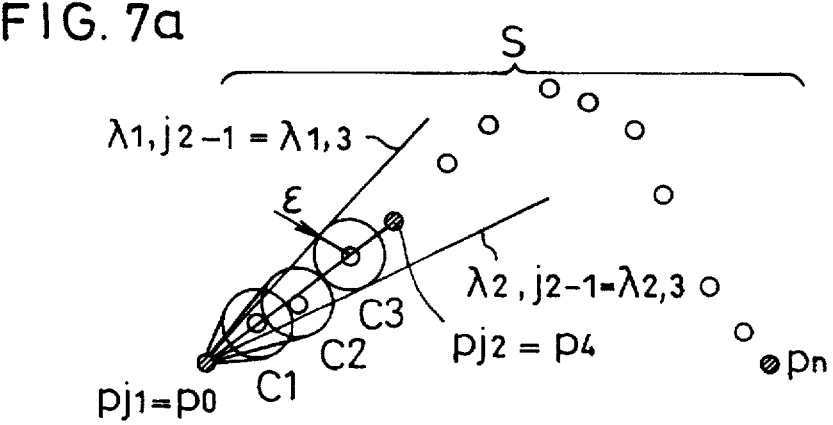
FIGS. 7a to 7d are diagrams showing the concept of a polygonal line approximation processing in the embodiment of FIG. 2.
Figure 7B:
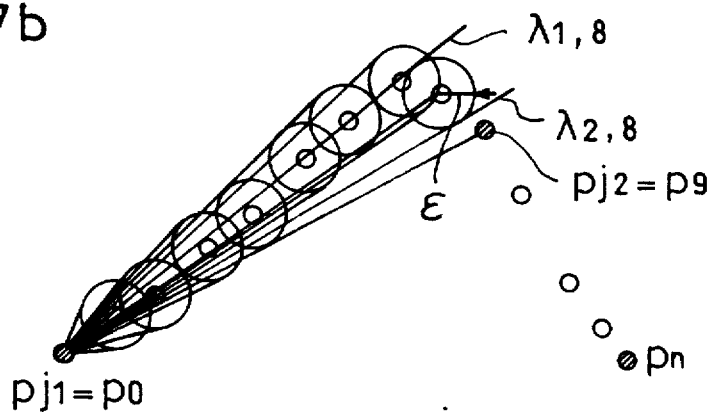
Figure 7C:
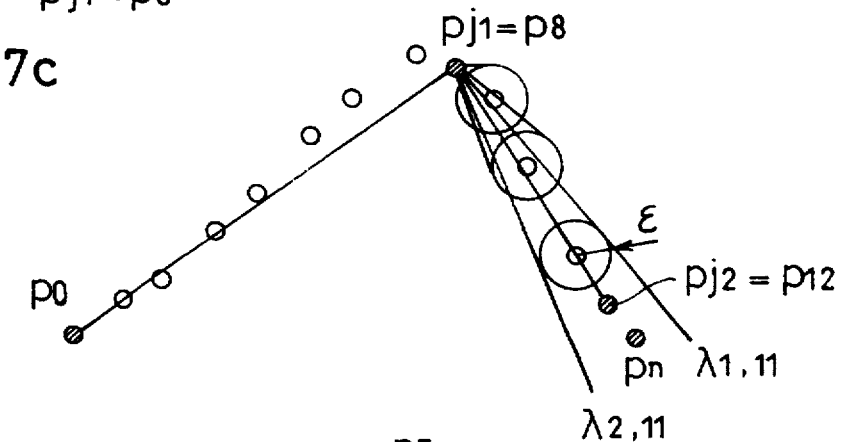

While the dot row S obtained in the forgoing manner represents an objective shape to be compared with a shape model, the comparison of the dot row S is time-consuming, so the particular row of the dot row S is to be approximated by polygonal lines. Various processes for approximating the dot row S as polygonal lines have been suggested, but one known as a tracing process is employed here. That is, as shown in FIGS. 7a–7d, it is assumed that the respective dots $P_j$ (j=0, 1, . . . , n) contained in the dot row S which is the object of the polygonal line approximation are arranged sequentially from the left side. A starting dot $P_0$ is regarded as one end dot $P_{j1}$ while another dot $P_j$ contained in the dot row S is regarded as the other end dot $P_{j2}$, and a segment $<P_{j1}P_{j2}>$ interconnecting end dots $P_{j1}$ and $P_{j2}$ is set. If this segment <Pj1Pj2> is situated between two tangential lines $\lambda_{1,j2-1}$ and $\lambda_{2,j2-1}$ passing through the end point $P_{j1}$ and being tangential to a circle $C_{j2-1}$ of a radius $\epsilon$ having as its center a dot $P_{j2-1}$ immediately preceding the end dot $P_{j2}$, then the distance between the dot $P_{j2-1}$ and the segment $<P_{j1}P_{j2}>$ must be less than $\epsilon$. Therefore, the one end dot $P_{j1}$ remains fixed, but the other end dot $P_{j2}$ is changed to be the next dot and it is again judged whether or not the distance between the dot $P_{j2-1}$ and the segment $<P_{j1}P_{j2}>$ is less than $\epsilon$. In this manner, the longest segment $P_{j1}P_{j2}>$ of the distance between the dot $P_{j2-1}$ and the segment $<P_{j1}P_{j2}>$ below $\epsilon$ is selected. That is, in the example of FIG. 7a–7b the condition that the distance between the dot $P_{j2-1}$ and the segment $<P_{j1}P_{j2}>$ is less than $\epsilon$ occurs up to point p8, as shown in FIG. 7b, but this condition is no longer satisfied at P9 (because the circle having P8 as its center intersects P7), so that a segment $<P_0P_8>$ is regarded as the longest segment.

Figure 7D:
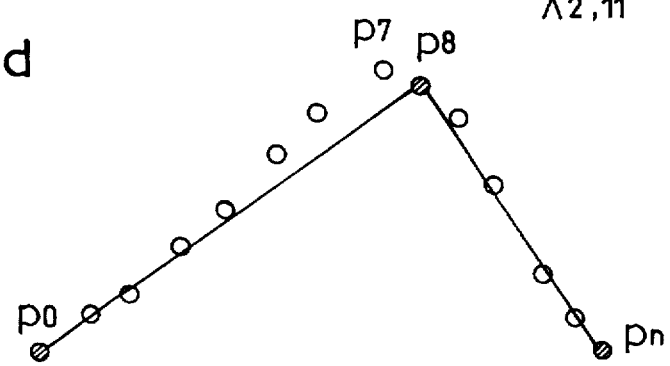

Next, the last end dot $P_{j2}$ (P8 in the above example) satisfying the above condition is regarded as the fixed end dot $P_{j1}$, and the longest segment $<P_{j1}P_{j2}>$ of the distance between the dot $P_{j2-1}$ and the segment $<P_{j1}P_{j2}>$ less than e is determined by the same steps. That is, in the example of FIGS. 7c, 7d, the foregoing processing is repeated, starting from P8. In this way, the processing of the segment $<P_{j1}P_{j2}>$ is carried out until the end dot $P_{j2}$ reaches the terminating dot $P_n$, and eventually it is made possible to approximate the dot row S by two polygonal line segments $<P_{j1}P_{j2}>$, as shown in FIG. 7d.

Figure 8:
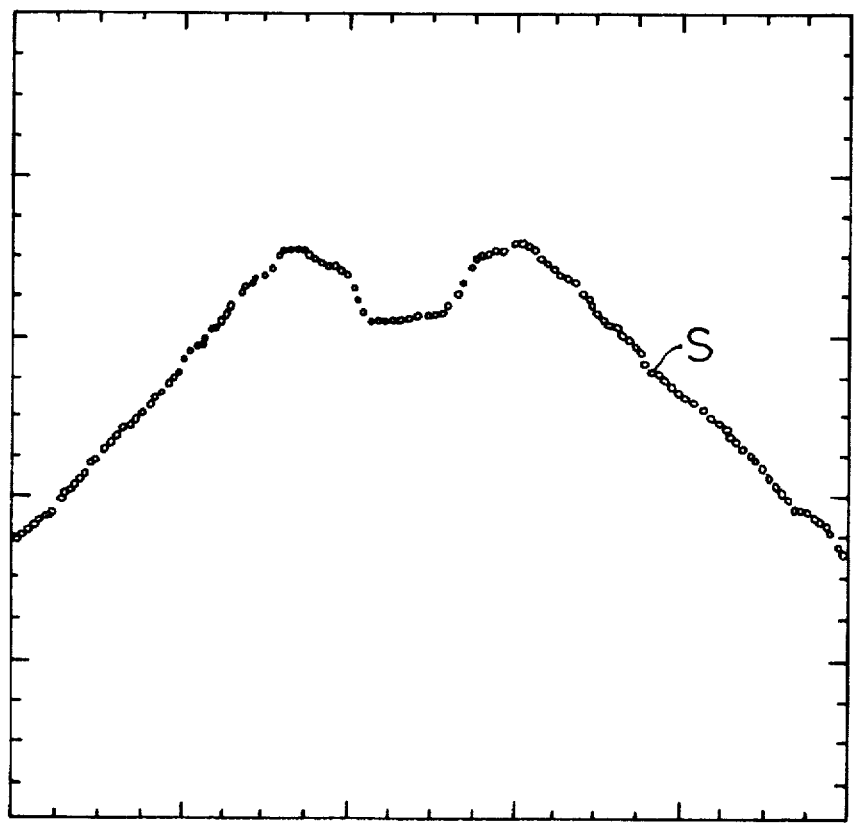
FIG. 8 is a diagram showing an example of the dot row in the embodiment of FIG. 2.

When a figure thus obtained by approximating the dot row S by means of the polygonal lines in the manner described above, it is possible to represent the sectional shape of the object 11 by means of the positions of the apexes and line elements (straight and curved lines) interconnecting the respective apexes, and, it is possible to significantly reduce the data needed and to speed up the matching processing, as compared to the case of FIG. 8 for example.

Figure 9:
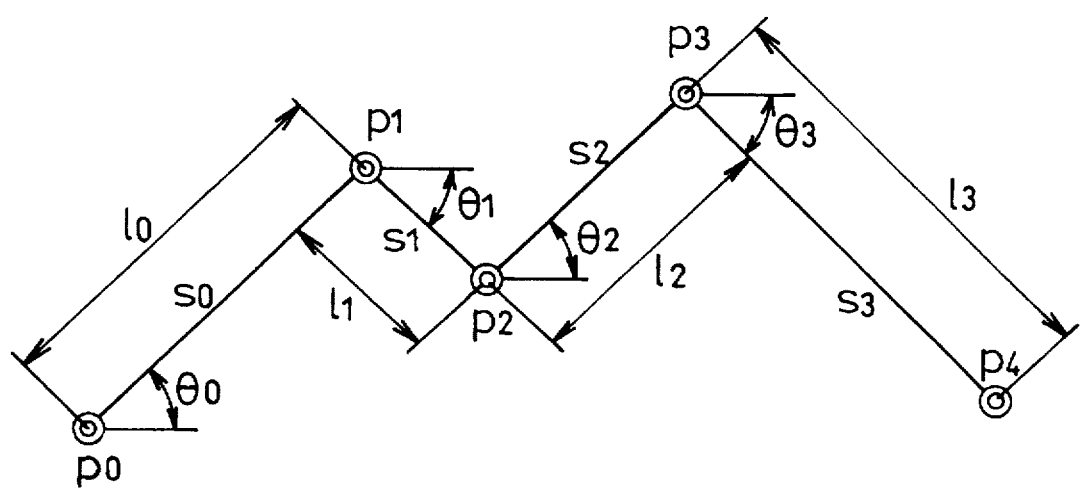
FIG. 9 is a diagram showing an example of the shape model used in the embodiment of FIG. 2.

Since, in the disclosed preferred embodiment the shape of the object 11 is substantially M-shaped, a shape shown in FIG. 9 which is represented by four line segments $s_0$ to $s_3$ interconnecting five nodal points $p_0$ to $p_4$ can be employed as the shape model. As regards the shape model, the lengths $l_0$–$l_3$ of the respective line segments $s_0$ to $s_3$ are known. Also, the gradients or angles $0_0$–$0_3$ of the respective line segments $s_0$ to $s_3$ with respect to the abscissa of the two dimensional plane are known. Further, the tolerance $[1_{mink}, 1_{maxk}]$ of each length as well as the tolerance $[^0_{mink}, ^0_{maxk}]$ and standard values $1_{stk}$ and $0_{stk}$ of lengths and gradients, respectively, are set (with k being from 0 to 3). The following relationship will be satisfied:

$$1_{mink} < 1_{stk} < 1_{maxk}$$

$$^0_{mink} < ^0_{stk} < ^0_{maxk}$$

Here, the tolerances $[1_{mink}, 1_{maxk}]$ and $[^0_{mink}, ^0_{maxk}]$ of lengths and gradients are properly set in accordance with possible fluctuations in the size of the line graph obtained from the object 11.

Figure 3:
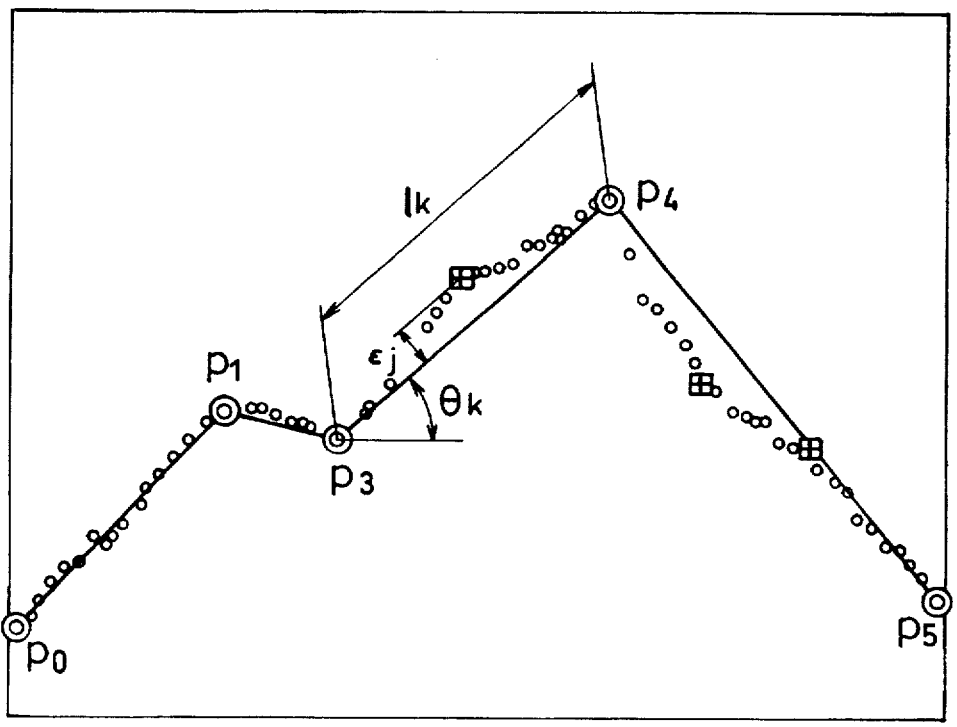
FIG. 3 is a diagram for explaining the concept of deviation quantity in the embodiment of FIG. 2.

Once the objective shape of the object 11 is obtained through the polygonal line approximation, a pattern-matching with the shape model is carried out (see FIG. 3). In the matching processing, the same number of the nodal points as the nodal points $P_0$ to $p_4$ of the shape model for the collation are first selected from the objective shape (it is assumed here that the objective shape has a larger number of nodal points than the number of the nodal points $p_0$ to $p_4$ of the shape model). In particular, there are obtained from the objective shape, the length of each segment and its gradient with respect to the abscissa (reference line) of the two dimensional plane. Further, with respect to all of the nodal points of the objective shape, their respective distances $\epsilon_j$ from the closest one of the segments forming the shape model are obtained, and an average value of their distance is defined as a potential deviation component Ep. In FIG. 3, there is shown the distance $\epsilon_j$ of a nodal point from the segment length $1_k$ of the shape model which has a gradient $0_k$. Double circles designate nodal points $p_0$ to $p_4$ which are common to the shape model and the objective shape, while the four small square marks designate the non-common nodal points of the objective shape obtained through the polygonal line approximation process of FIGS. 7a to 7d. The potential deviation component Ep is represented by the following formula, when n is the number of dots $p_i$ contained in the dot row S of the objective shape (or number of nodal points in the case when subjected to the polygonal line approximation):

$$Ep = \sum_{j=0}^{n-1} (ej)/n$$

Next, the length and gradient of the respective segments of the objective shape are compared with the tolerance set with respect to the shape model so that, when each length and gradient are outside of (i.e. deviate from) the set tolerance, sums of length and gradient deviations E1 and $E^0$ are obtained, i.e., a length deviation component $D1_k$ and an angular gradient deviation component $D1_k$ and an angular gradient component $Ds_k$ (k being the number of the line segments in the shape model). That is the length deviation components $D1_k$ and angular deviation component $Ds_k$ are represented respectively by such formulas as follows:

$$D1_k = \begin{cases} 1_k - 1_{maxk} & (1_k > 1_{maxk}) \\ 0 & (1_{mink} < 1_k < 1_{maxk}) \\ 1_{mink} - 1_k & (1_k > 1_{mink}) \end{cases}$$

$$Ds_k = \begin{cases} \theta_k - \theta_{maxk} & (\theta_k > \theta_{maxk}) \\ 0 & (\theta_{mink} < \theta_k < \theta_{maxk}) \\ \theta_{maxk} - \theta_k & (\theta_k > \theta_{mink}) \end{cases}$$

Further, the respective deviation sums E1 and $E^0$ of the length deviation component $D1_k$ and angular deviation component $Ds_k$ are represented respectively by the following formulas:

$$E1 = \Sigma(D1_k), \quad E^0 = \Sigma(Ds_k)$$

Here, the range of k is 0 to 3 (four line segments) in the case of the shape model shown in FIG. 9.

When the potential deviation component Ep and the respective sums E1 and $E^0$ of the length deviation component $D1_k$ and angular deviation component $Ds_k$ are obtained, then a weighted sum of the respective components Ep, E1 and $E^\theta$ is obtained as a deviation quantity $E_{total}$, which can be represented by the following formula, with respective weight coefficients Wp, W1, $W^\theta$ with respect to the respective components Ep, E1, and $E^\theta$.

$$E_{total}=Wp\times Ep+W1\times E1+W^\theta\times E^\theta$$

The selecting method for the nodal points in which the deviation quantity $E_{total}$ as defined above is obtained with respect to all possible combinations of nodal points of the objective shape, whereupon the objective shape having the lowest value of $E_{total}$ (hereinafter referred to as the "minimum deviation quantity") shall be chosen for comparison with the shape model.

Figure 35:
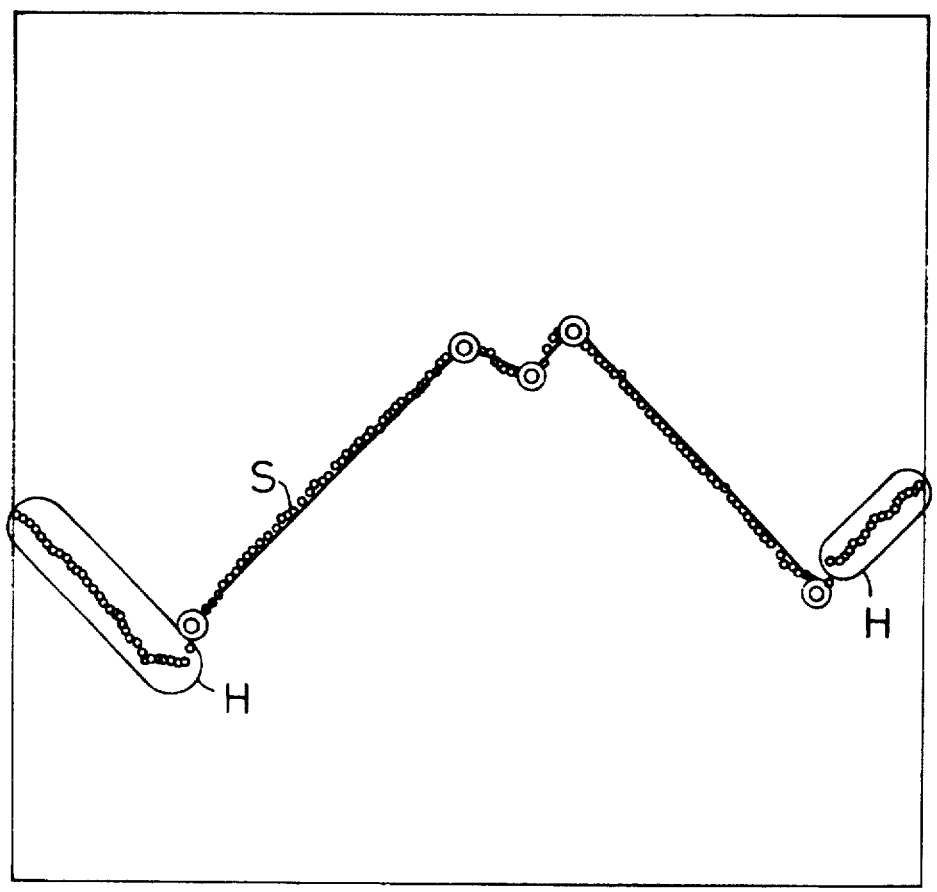
FIGS. 35 and 36 are diagrams showing examples of application of the embodiment of FIGS. 1 to 9.
Figure 36:
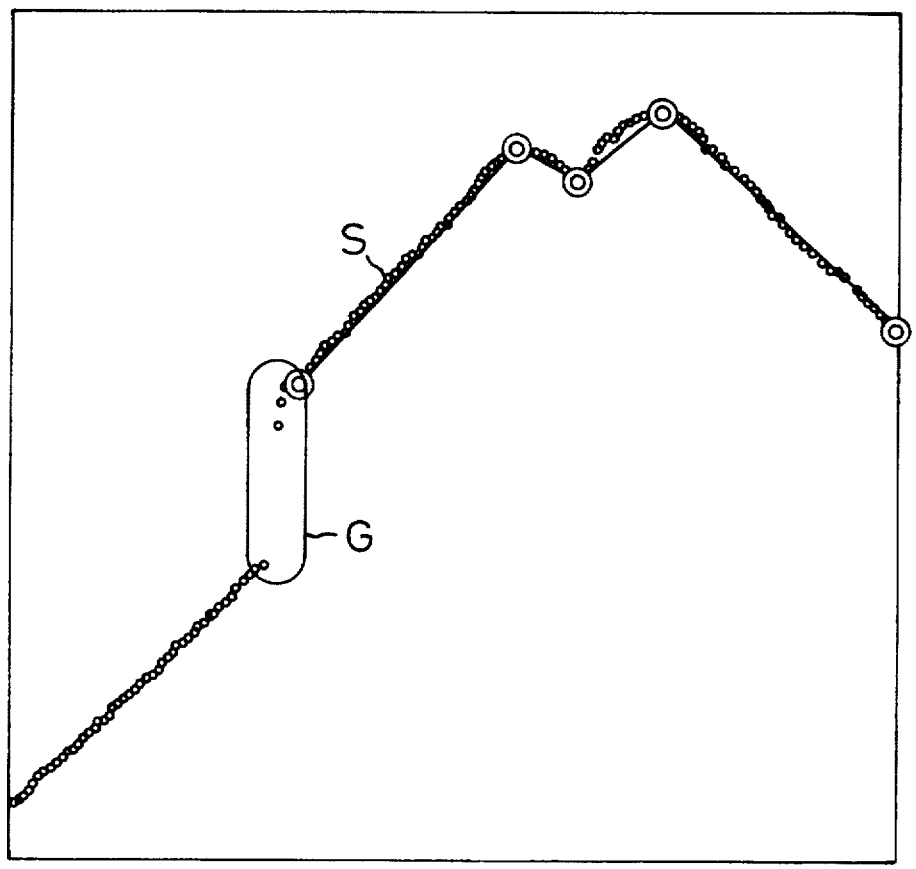

Since the matching processing is carried out by calculating the deviation associated with each potential object shape having the same number of nodal points as the shape model, it is possible that there may occur an event where, as shown in FIG. 35, the dot row S includes unnecessary information due to the presence of holders H holding the plate members to be welded and located in the sight of the image pick-up means 13, for example, or an event where, as shown in FIG. 36, a discontinuation G is formed in the dot row S due to a hole opened adjacent to a welding line, and an intended shape can be easily extracted (interpolated).

Figure 4:
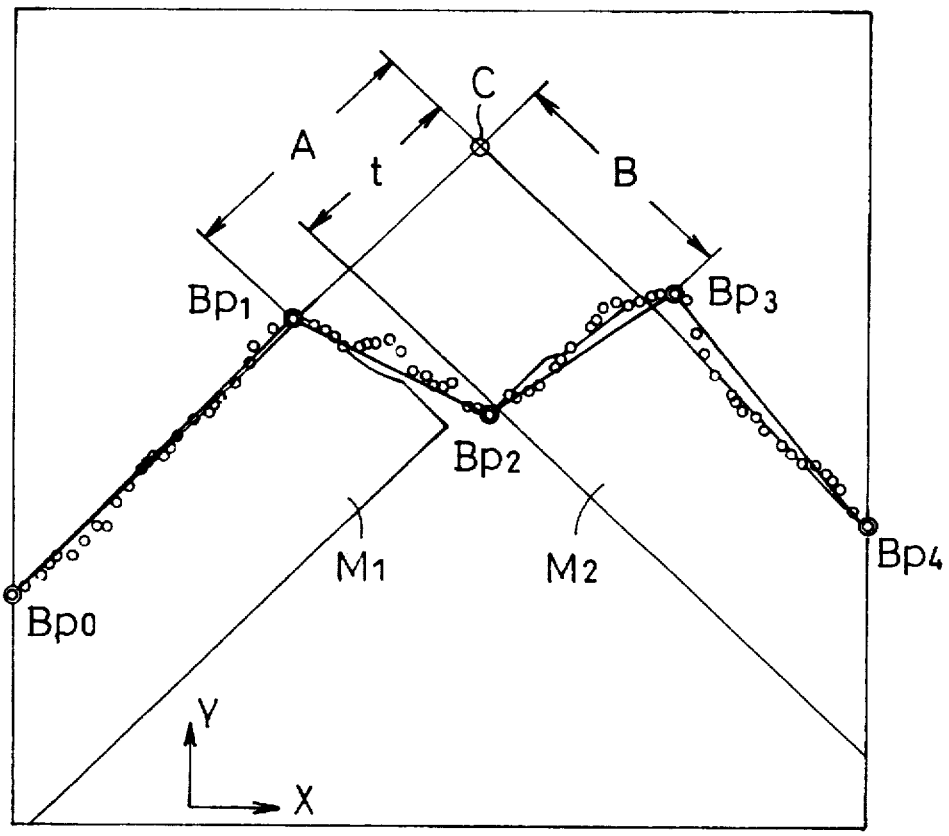
FIG. 4 is an explanatory diagram for showing an example of a matching processing in the embodiment of FIG. 2.

Now it is assumed that the result of the matching processing is an object shape represented by nodal points $B_{p0}$ to $B_{p4}$ and segments interconnecting these nodal points $B_{p0}$ to $B_{p4}$ (see FIG. 4). In FIG. 4, the actual shape of the object 11 ($M_1$ and $M_2$) is superposed on the result of the matching processing. Here, the positional relationship of a pair of plate members $M_1$ and $M_2$ forming the corner joint to be welded together is to be measured, and the plate thickness t of the plate members $M_1$ and $M_2$ is assumed to have been known. In the present case, any gap in the joint can be obtained as, in FIG. 4, a difference between distance A and the plate member thickness t, while any step formed in the joint can be obtained as a distance B, and the position of the joint can be obtained as coordinates of a point C in FIG. 4. In short, the shape of the joint can be measured in the sequence shown in FIG. 5.

Figure 2:
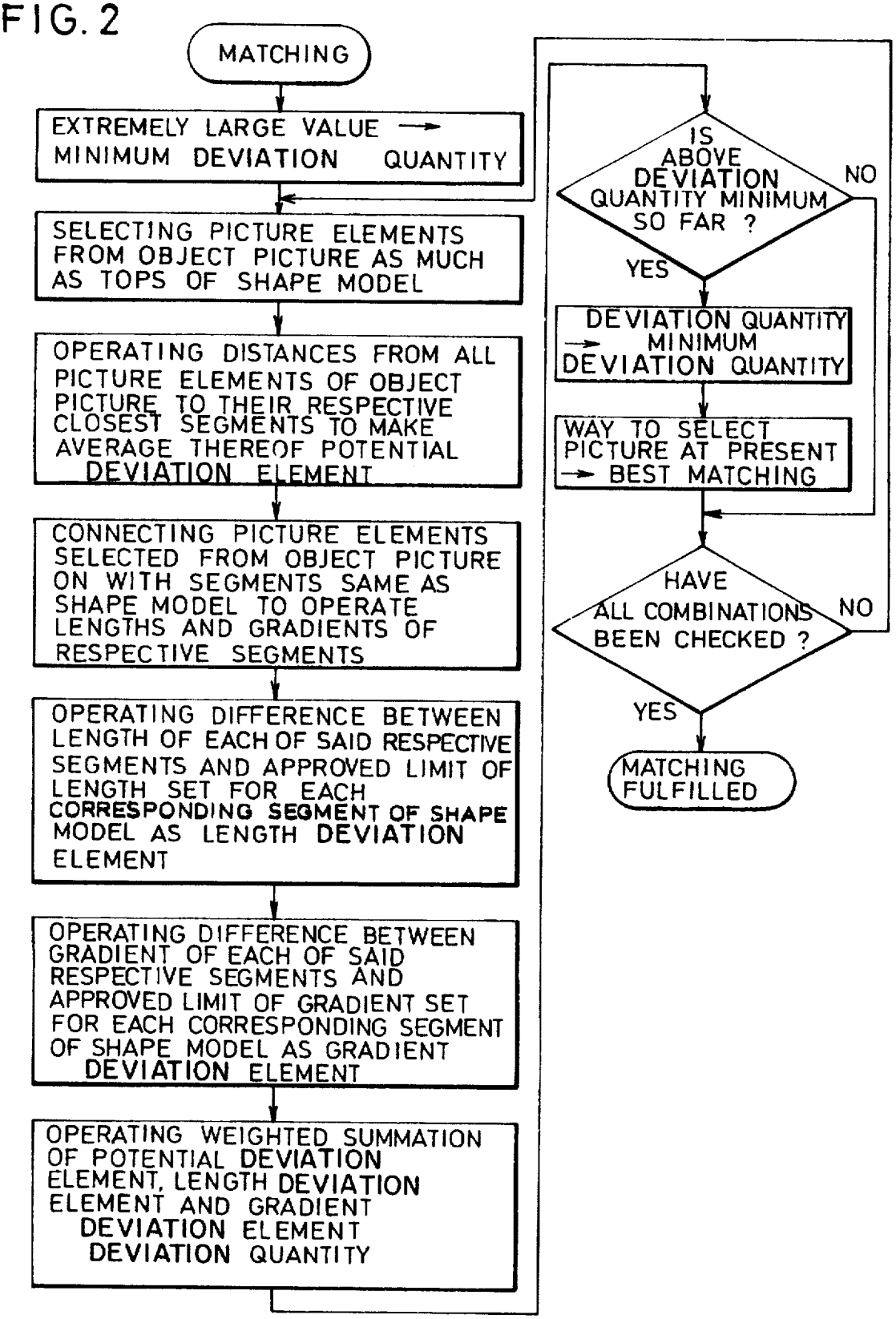
FIG. 2 is a flow chart for explaining an embodiment of the shape recognition process according to the present invention.
Figure 10A:
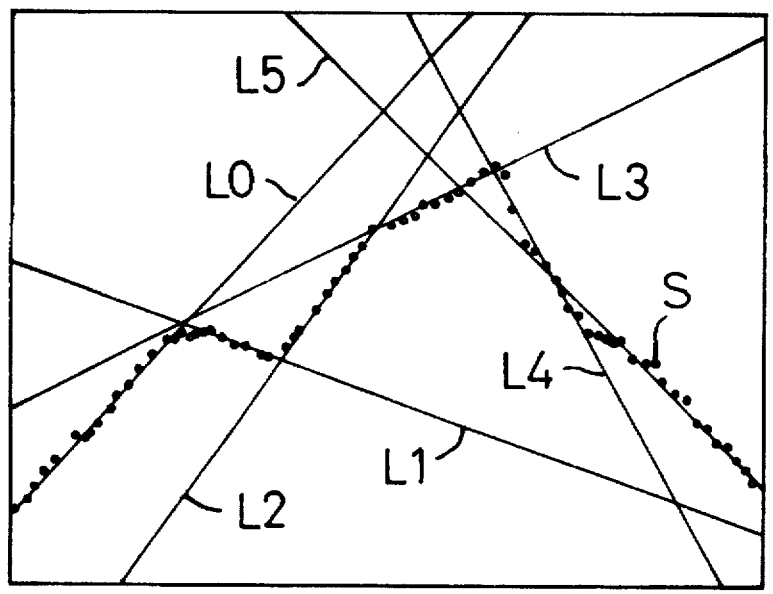
FIG. 10a and 10b are diagrams for explaining a Hough Transformation employed in another embodiment according to the present invention.

While in the foregoing embodiment of FIG. 2 the objective shape has been simplified by means of the polygonal line approximation of the dot row S which is the input objective shape, another embodiment of the present invention for obtaining the objective shape involves executing a Hough Transformation with respect to the dot row S. That is, straight lines $L_i$ (i=0 to 5) are applied to such dot row S as shown in FIG. 10a by means of the Hough Transformation, and points of intersection of the respective straight lines $L_i$ and the end dots of the dot row S are employed as nodal points $B_{ki}$ (i=0 to 6). Other points of intersection of the lines $L_i$ which are not in a range close to the dot row S are deleted, and the employed nodal points $B_{ki}$ are limited to be at most two for each straight line $L_i$ so that no unnecessary nodal point is to be obtained.

Here, the method of using the straight line by means of the Hough Transformation has been well known and shall be briefly explained. That is, it has been known that a Hough curve in a polar space (parameter space) obtained by executing the Hough Transformation with respect to each dot of the dot row S has one point of intersection when each dot is present on each straight line. When a dot which can be regarded as the point of intersection of the Hough curve is obtained, this dot is to represent the straight line $L_i$ which represents the dot row S present substantially on one straight line, and the application of the straight lines $L_i$ to the dot row S can be performed, by obtaining the points of intersection of the Hough curve. As the nodal points $B_{ki}$ are obtained, the same operation as that in the embodiment shown in FIG. 2 is made applicable by obtaining line segments elements $s_i$ connecting sequentially between the nodal points $B_{ki}$. That is, it is also possible to compress the data amount of the dot row S even when the Hough Transformation is employed. For other respects of this embodiment, they are the same as those in the foregoing embodiment, of FIG. 2.

Figure 11:
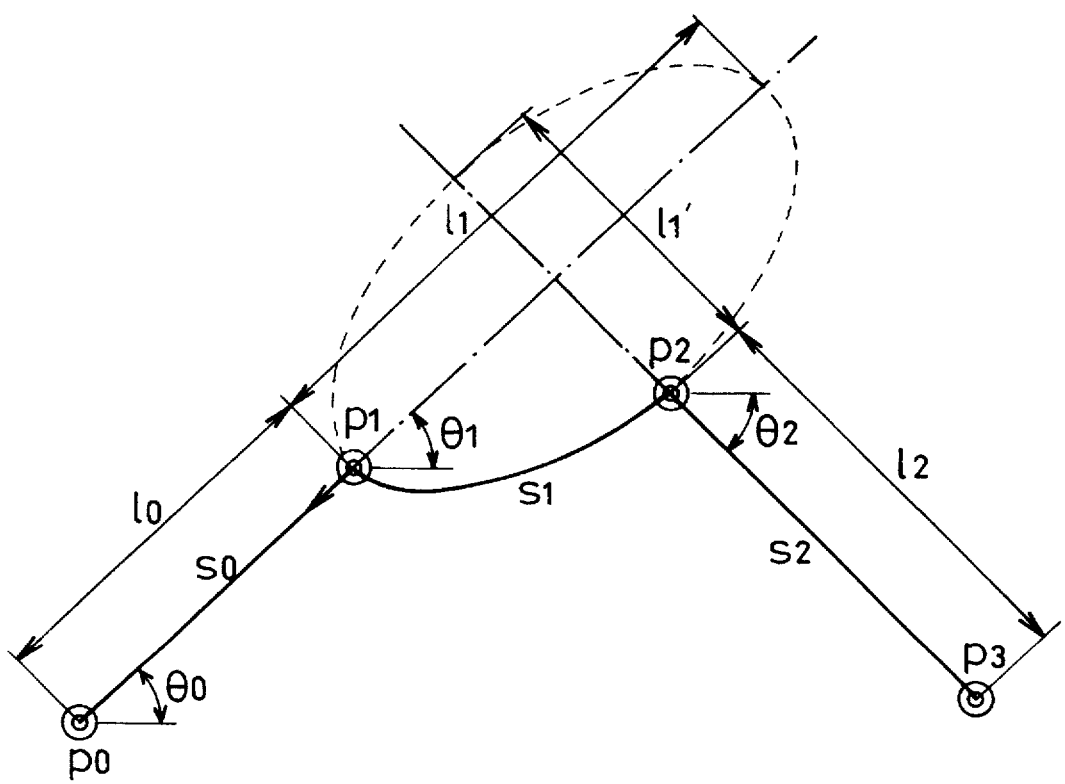
FIG. 11 is a diagram showing an example of the shape model used in still another embodiment according to the present invention.

While in the above embodiment according to FIG. 9 the respective nodal points $P_k$ of the shape model are connected only by means of the segments, still another embodiment according to the present invention shown in FIG. 11 employs part of an ellipse as a line element connecting between the nodal points. That is, while the shape model in the embodiment shown in FIG. 9 (see also FIG. 2) includes the polygonal lines connecting the nodal points $P_0$-$P_1$-$P_2$-$P_3$-$P_4$, the present embodiment interconnects the nodal points $p_1$ and $p_2$ by a line element $s_1$ which is forming part of an ellipse (partial ellipse) having major and minor axes which are extensions of segments $s_0$ and $s_2$.

In this case, for the portion between both nodal points $p_1$ and $p_2$, the length of the line element is defined by the major radius $1_2$ and minor radius $1_1$, and, for the gradient of the line element, the same is defined by a gradient $\theta_1$ of the major axis with respect to the abscissa. For the flatness of the ellipse (=minor radius/major radius), a standard value and a tolerance are set. Other arrangements are the same as those in the embodiment of FIG. 9 (see also FIG. 2).

Figure 12A:
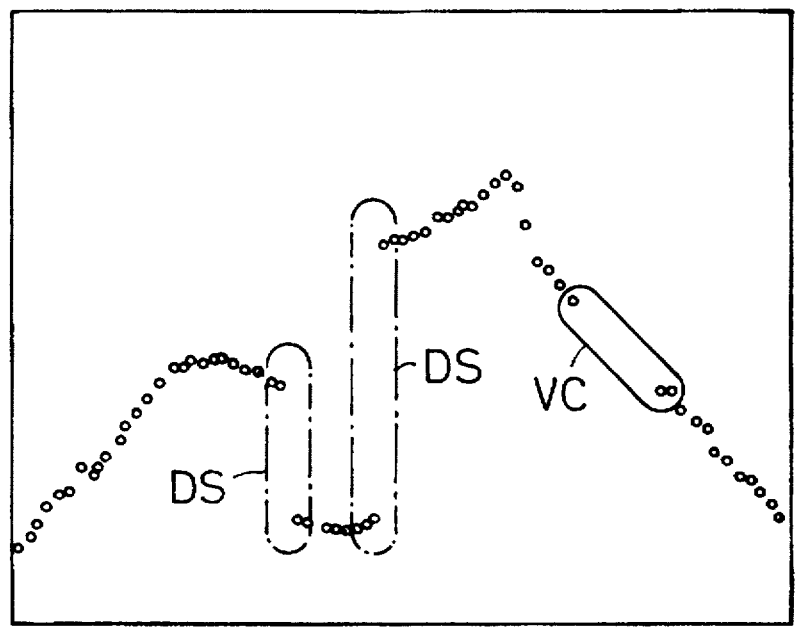
FIGS. 12a and 12b are diagrams for explaining an interpolation processing of the dot row in another embodiment according to the present invention.
Figure 12B:
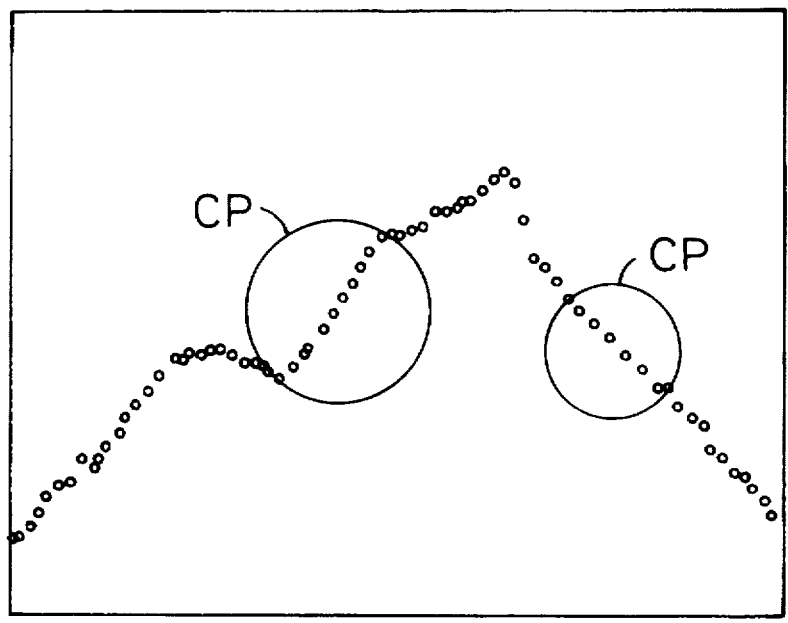

In still another embodiment according to the present invention, there is provided a processing method for an event where the dot row S obtained as a picture of the object 11 involves a discontinuity DS and vacancy of data VC (see FIG. 12a), in which event an interpolation is executed for obtaining a continuity in the dot row S as shown in FIG. 12b, prior to the obtention of the objective shape through the polygonal line approximation of the dot row S (in FIG. 12b the interpolated portions are denoted by CP). The interpolation is a processing of connecting between end dots as the discontinuity portion with a straight line, and such interpolation carried out allows the objective shape to be obtained through the polygonal line approximation in the same sequence as in the embodiment of FIG. 2. Other arrangements are the same as those in the embodiments of FIG. 2.

While in the embodiment of FIG. 2 the tracing process is employed to perform the polygonal line approximation with respect to the objective shape, there is a possibility that, in an event where the objective shape involves a fluctuation, the number of the nodal points $B_{pi}$ obtained with respect to the objective shape is less than that of the nodal points $p_1$ of the shape model, and there arises a problem that the matching processing cannot be performed when the number of the nodal points $B_{pi}$ obtained for the objective shape is not in conformity $B_{pi}$ obtained for the objective shape is not in conformity to the number of the nodal points $p_1$ of the shape model.

Figure 13A:
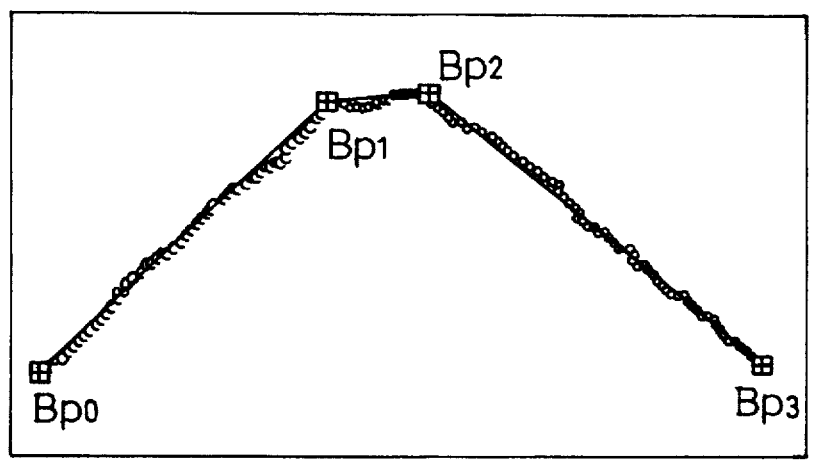
FIGS. 13a to 13c are diagrams for showing the concept of processing steps in still another embodiment according to the present invention.
Figure 13B:
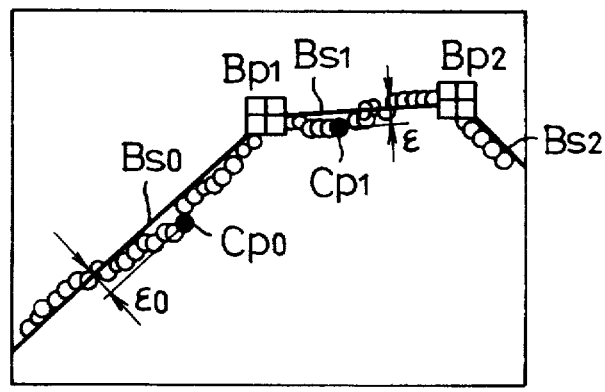
Figure 13C:
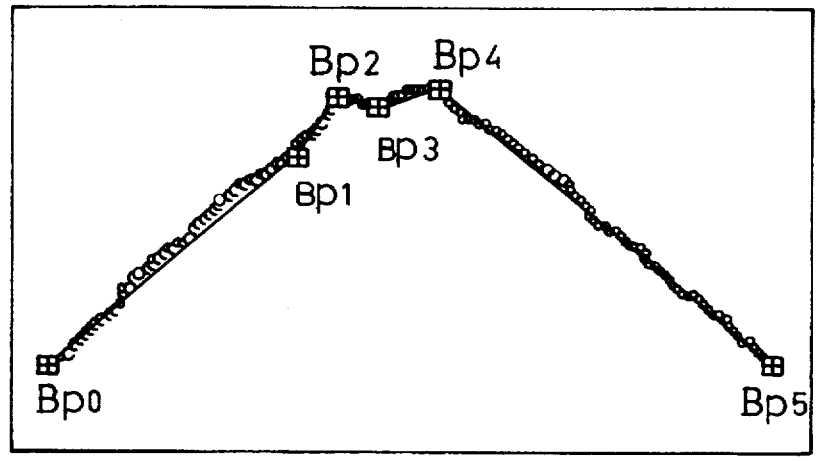

Accordingly, another embodiment according to the present invention shown in FIGS. 13a-c adopts a measure that is applicable in the event where the number of the nodal points $B_{pi}$ (i=0 to 4) obtained as a result of the polygonal line approximation as shown in FIG. 13a is less than the number of the nodal points $P_1$ of the shape model. The distance $\epsilon$ between the dot row S (interconnecting a pair of adjacent nodal points $B_{pi}$ and $B_{pi+1}$) and a line element $Bs_i$ interconnecting nodal points $B_{pi}$ and $B_{pi+1}$ is determined, and a dot $C_{pi}$ at the maximum distance $\epsilon_i$ is obtained as a candidate nodal point. After obtaining the candidate nodal points $C_{pi}$ with respect to the respective line elements $Bs_i$, the candidate nodal points $C_{pi}$ of a number needed to equal the nodal points of the shape model are employed as the nodal points $B_{pi}$ of the objective shape sequentially from the one larger in the maximum distance $\epsilon_i$, and, as shown in FIG. 13c, the nodal points $B_{pi}$(i=0 to 5) of the number over the nodal points $P_i$ are determined.

Figure 14:
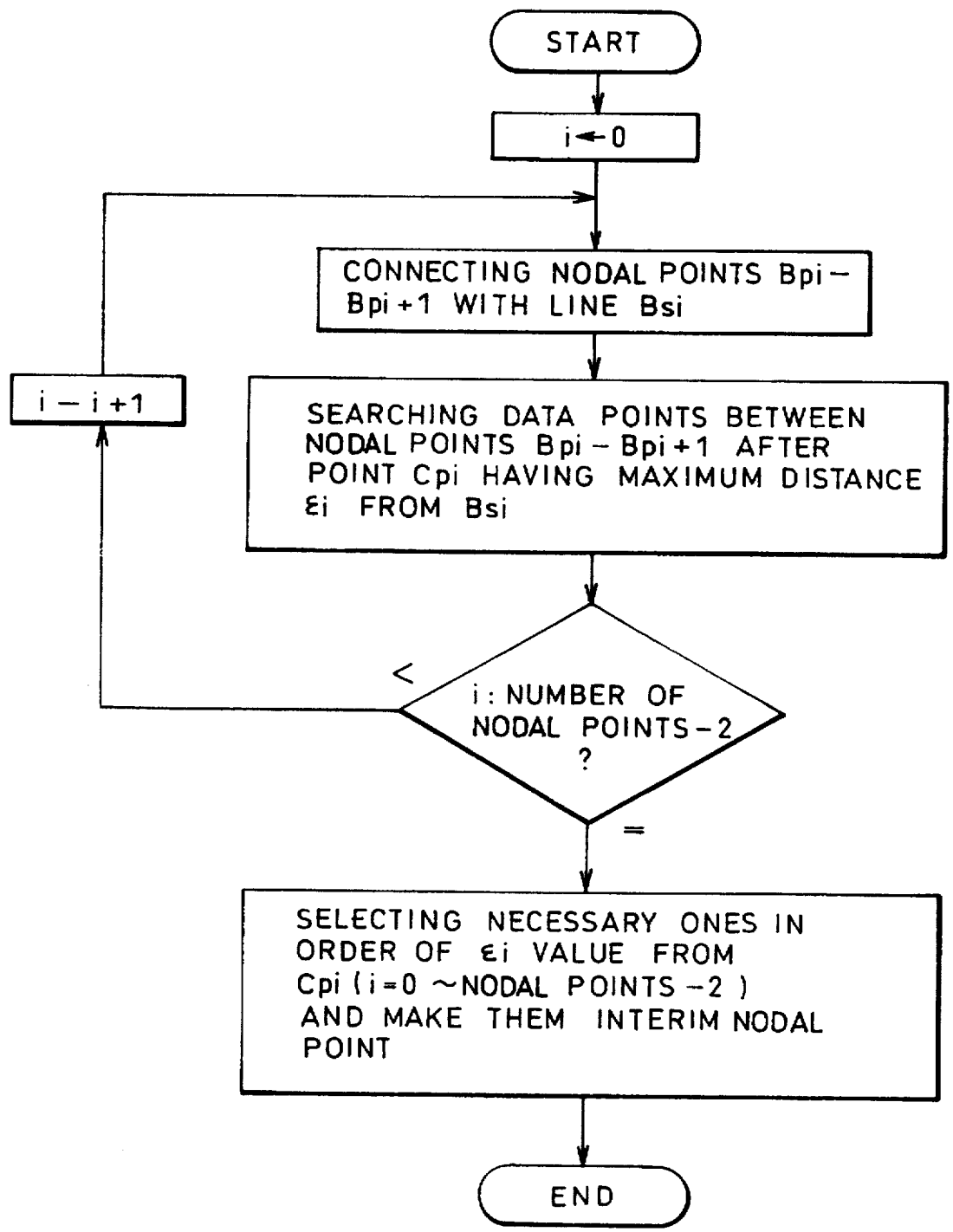
FIG. 14 is a flow chart showing the processing steps in the embodiment of FIGS. 13a to 13c.

The foregoing steps will be summarized as shown in FIG. 14. That is, after initializing the steps (to render i to 0), adjacent pairs of the nodal points $B_{pi}$ and $B_{pi+1}$ obtained through the polygonal line approximation are connected respectively sequentially with each of the line elements (segments) $Bs_i$, and the candidate nodal point $C_{pi}$ having the maximum distance $\kappa_i$ from the line element $Bs_i$ among the dot row S between both end nodal points $B_{pi}$ and $B_{pi+1}$ of the line element $Bs_i$ is sought. The candidate nodal points $C_{pi}$ are thus obtained with respect to all line elements $Bs_i$ by repeating the above steps until i will be the number minus 2 of the nodal points $B_{pi}$, and a required number of the candidate nodal $C_{pi}$ are selected in the order of the size of the maximum distance $\epsilon_i$ from the candidate nodal points $C_{pi}$ to be added to the nodal points $B_{pi}$.

With the employment of the foregoing steps, it is made possible to increase the number of the nodal points $B_{pi}$ to be maximum (2N−1) when the number of the nodal points $B_{pi}$ initially obtained is N. Further, when the number of the nodal points $B_{pi}$ thus increased by means of the candidate nodal point $C_{pi}$ is still less than the number of the nodal points $P_i$ of the shape model, the number of the nodal points $B_{pi}$ may be increased by employing again the above steps with respect to the nodal points $B_{pi}$ including the candidate nodal points $C_{pi}$. Other arrangements are the same as those in the embodiment of FIG. 2.

Figure 10B:
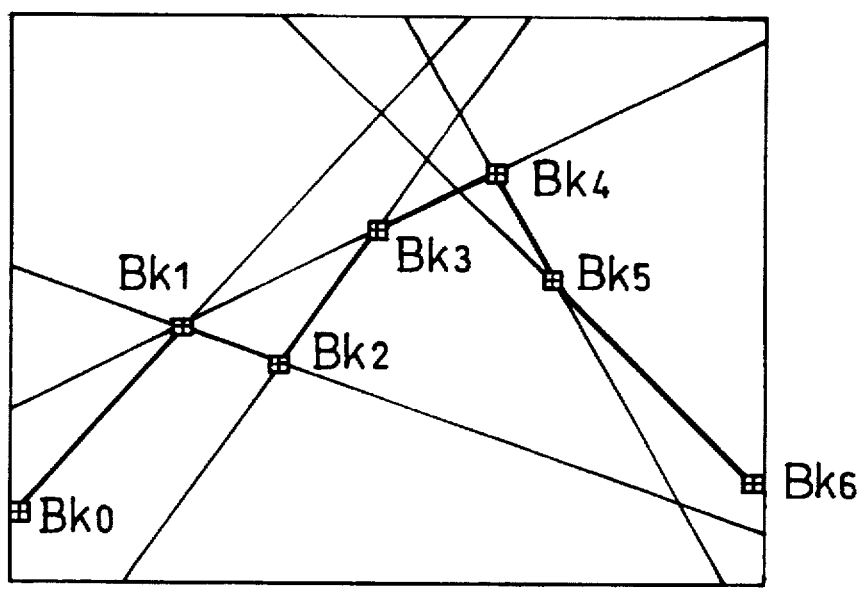
Figure 15A:
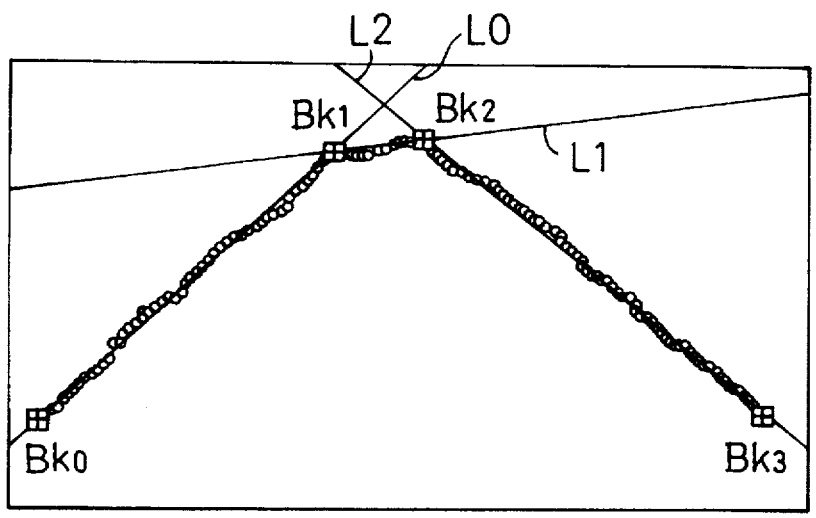
FIGS. 15a to 15c are diagrams for showing the concept of the processing steps in still another embodiment of the present invention.
Figure 15B:
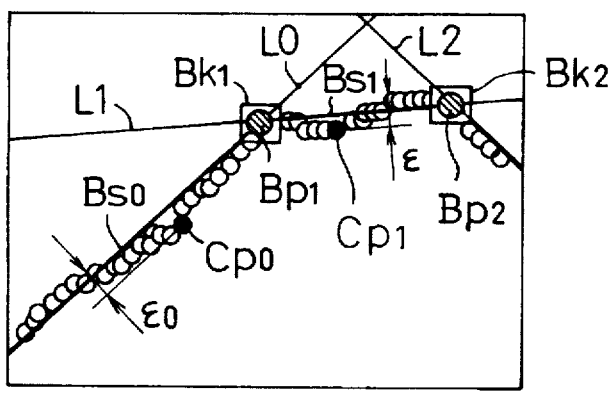
Figure 15C:
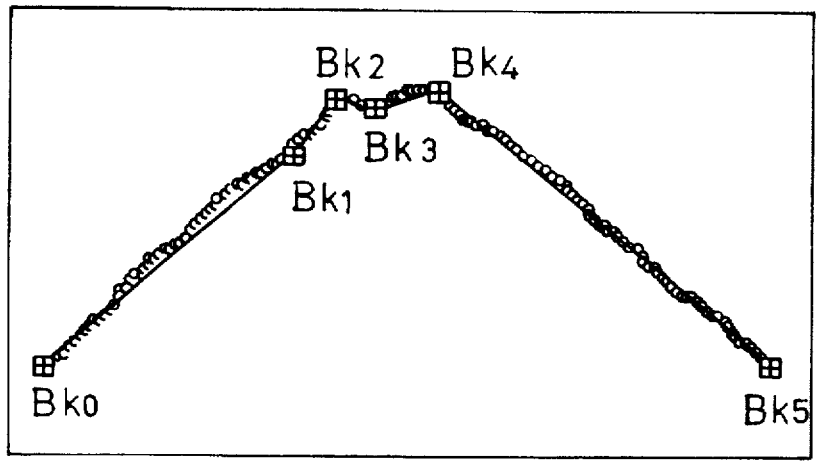

In still another embodiment according to the present invention shown in FIGS. 15a and 15C, there is shown an expedient for the case where the number of the nodal points $B_{ki}$ obtained from the objective shape is insufficient with respect to the nodal points $P_i$ similarly to the embodiment of FIGS. 13a–13c, and the arrangement is so made that the nodal points $B_{ki}$ are obtained from the objective shape by means of the Hough Transformation through the steps in the embodiment of FIG. 10. In obtaining the nodal points $B_{ki}$ by means of the Hough Transformation, straight lines $L_i$ responsive to dots according to the points of intersection of the Hough curve in the converted space (polar coordinate space) are obtained. Also, the points of mutual intersection of the lines $L_i$ and end dots of the dot row S are employed as the nodal points $B_{ki}$ as shown in FIG. 15a, so that the nodal points $B_{ki}$ are not always in conformity to the dots contained in the dot row S. In the present embodiment, therefore, instead of employing the points of intersection between the straight lines, $L_i$ as the nodal points $B_{ki}$, the closest dots among the dots $P_i$ contained in the dot row S to the points of intersection of the straight liens $L_i$ are employed as the nodal points $B_{pi}$. The following steps are the same as those in the embodiment of FIGS. 13a–13b, in which the dots contained in the dot row S at a maximum distance $\epsilon_i$ between the row S and a line element $Bs_i$ (interconnecting the adjacent nodal points $B_{pi}$ and $B_{pi+1}$) are made to be the candidate nodal points $C_{pi}$. The number of such nodal points $C_{pi}$ which are selected constitutes the number enabling the nodal points of the objective shape to equal the shape model. They are selected in the order of the size of the maximum distance $E_i$ and are added to the nodal points $B_{ki}$. In this manner, it is possible to determine the nodal points $B_{ki}$ of the objective shape so as to render them to be more than the number of the nodal points $P_i$ of the shape model as shown in FIG. 15c.

Figure 16:
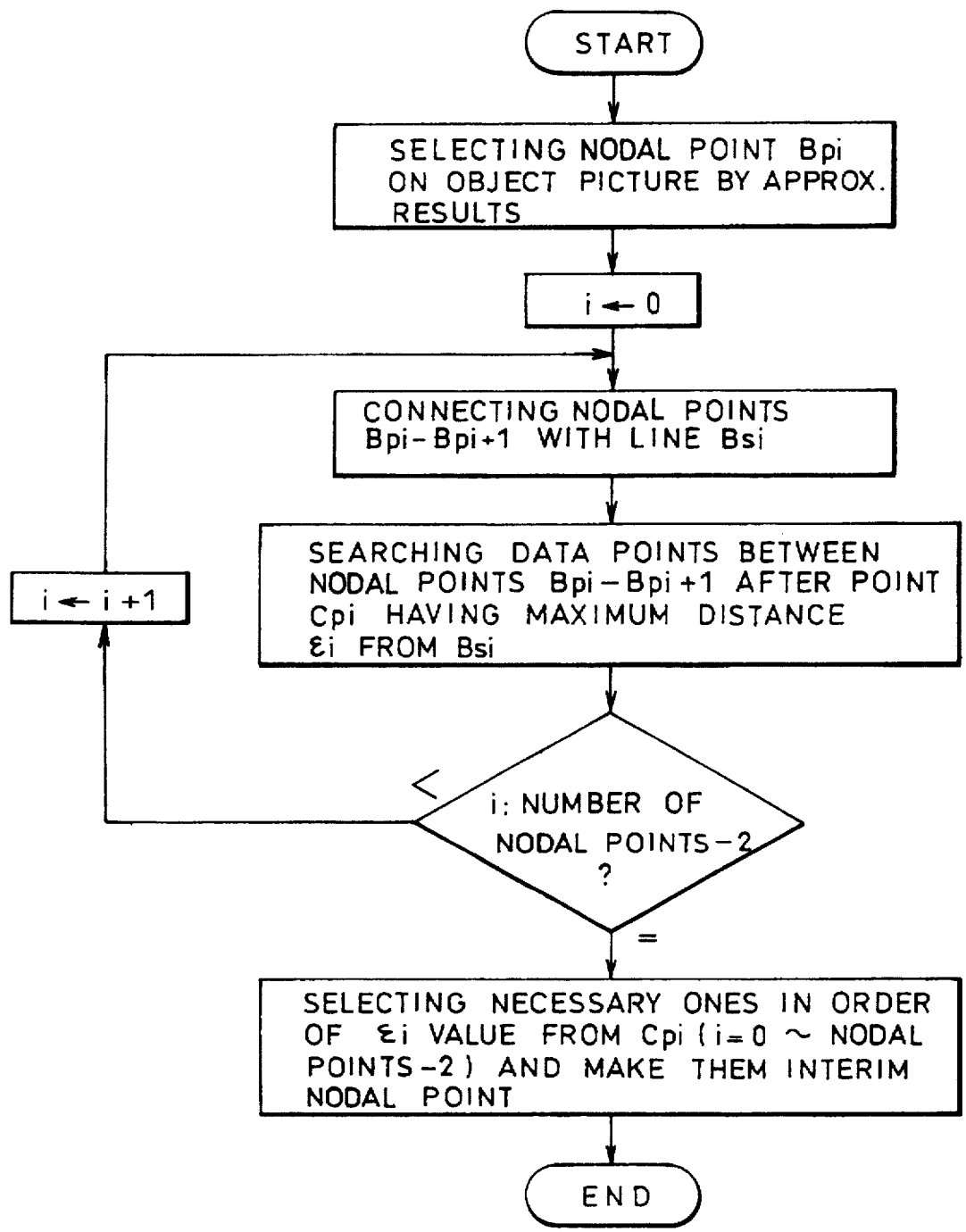
FIG. 16 is a flow chart showing the processing steps in the embodiment of FIGS. 15a to 15c.

A summary of the above steps will be as illustrated in FIG. 16, a difference of which from the embodiment shown in FIG. 14 (see also FIG. 13) resides in the step of obtaining the dot $P_i$ contained in the dot row S adjacent to the points of intersection of the straight lines $L_i$ (obtained through the Hough Transformation prior to the initialization), the dot $P_i$ being employed as the initial nodal point $B_{pi}$. Other steps are the same as those in the embodiment of FIG. 10.

Figure 17:
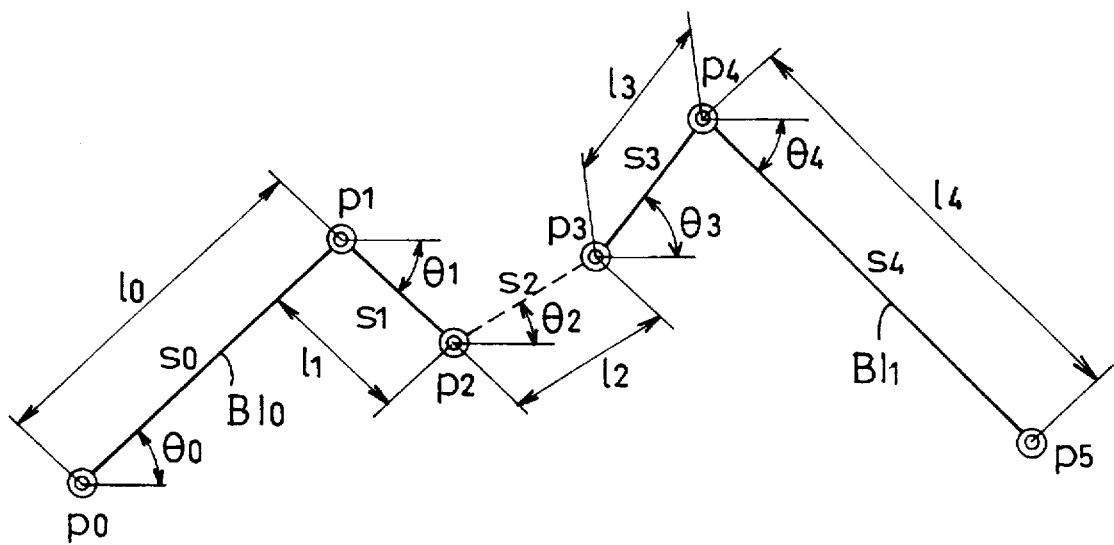
FIG. 17 is a diagram showing the shape model employed in still another embodiment according to the present invention.
Figure 18:
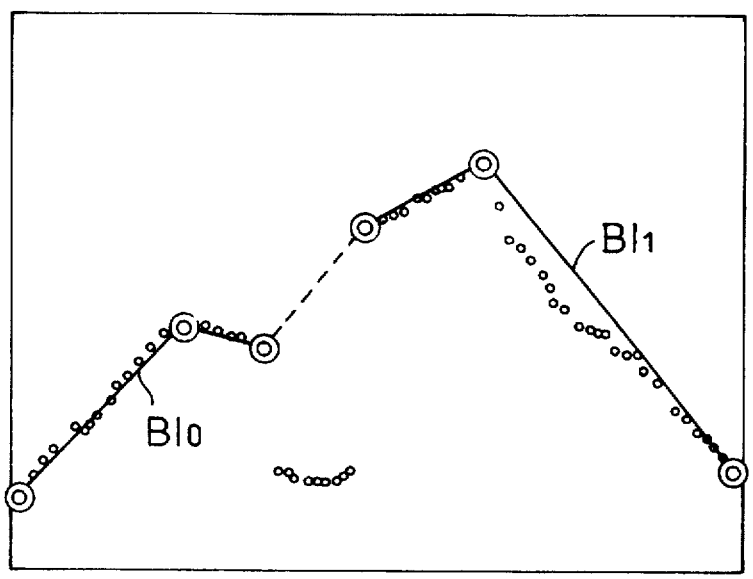
FIG. 18 is a diagram showing an example of the still another embodiment of FIG. 17.

In still another embodiment according to the present invention, there is provided a process for performing the matching processing of a combination of the shape models respectively of a comparatively simpler shape with respect to the objective shape, in which the collation with the shape models is carried out with respect to every portion of the objective shape. That is, as shown in FIG. 17, a segment $s_2$ connects between blocks $B1_0$ and $B1_1$ of the shape models. In this case, the segment $s_2$ is treated in the same manner as other segments, and the standard value and tolerance are set with respect to the length and gradient. By setting the shape model in the manner described above, it is made possible to perform the matching processing with respect to the objective shape with the two shape models employed. Other arrangements are the same as those in the embodiment of FIG. 2.

Figure 19A:
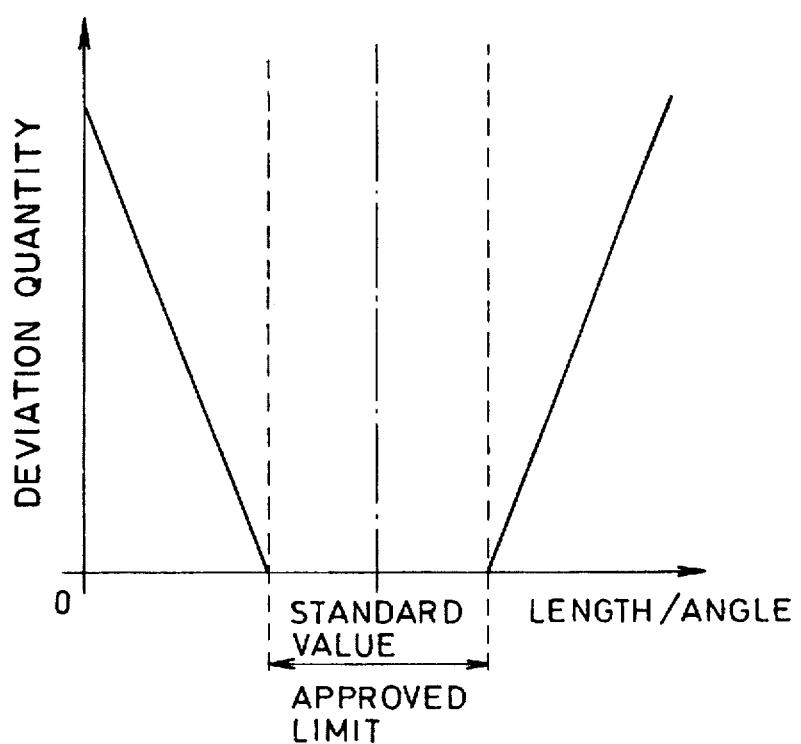
FIGS. 19a and 19b are diagrams for explaining the concept of deviation quantity in still another embodiment according to the present invention.
Figure 19B:
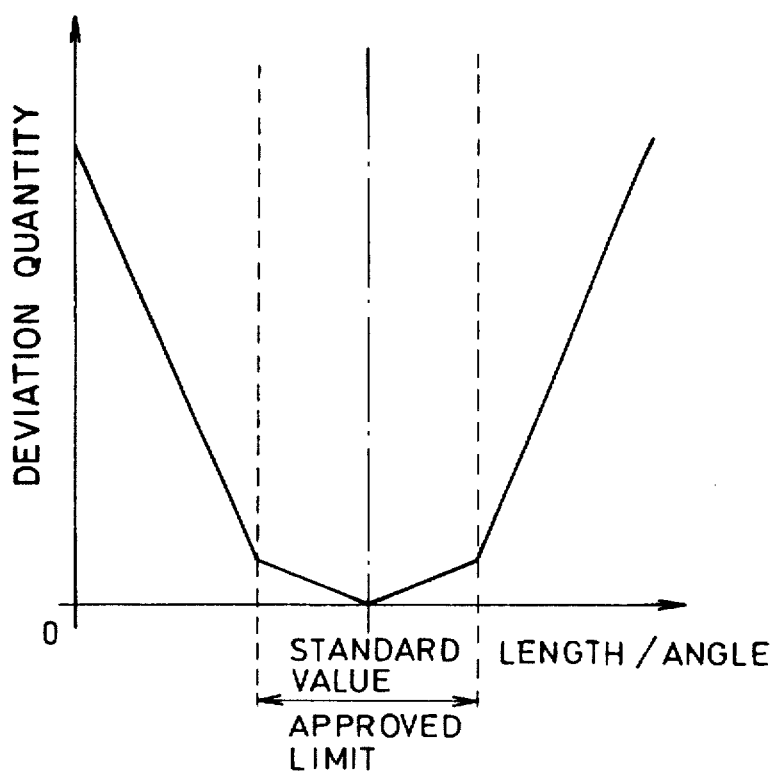

In the foregoing embodiment of FIG. 2 the length deviation component $D1_k$ and angular deviation component $Ds_k$ are so set as to be 0 so long as the length $1_k$ gradient $\theta_k$ are within a given tolerance as shown in FIG. 19a when obtaining the length component $D1_k$ and angular deviation $Ds_k$ through the collation of the objective shape with the shape model. In contrast, as shown in FIG. 19b, a value proportional to a difference between the objective shape and the standard value is given so long as the components are within the given tolerance but out of the standard value. That is, the length deviation component $D1_k$ and angular component $Ds_k$ are to provide values proportional to the standard value irrespective of whether they are inside or outside the tolerance, while the coefficient of proportionality is so set as to be smaller inside the tolerance than that outside the tolerance. By providing a value in accordance with the difference from the standard value even when that difference is inside the tolerance, it is possible to evaluate more strictly the difference of the objective shape from the standard value than in the embodiment of FIG. 2. Other arrangements are the same as those in the embodiment of FIG. 2.

In the foregoing embodiment of FIG. 2, a tolerance is set with respect to the shape model so that the shape model can be set to be of a deviated shape. And, even when the objective shape is different to a large extent in the case where such nodal points that render the deviation quantity $E_{total}$ to be the minimum upon performing the matching processing, a combination of the nodal points which minimize $E_{total}$ is always present, and the shape model will be in conformity to the objective shape. In this case, however, the fluctuation of the shape model becomes too large to render the value of $E_{total}$ to be a larger value. In still another embodiment according to the present invention, therefore, it has been perceived that the minimum deviation quantity denotes the extent of difference of the objective shape from the shape model, the arrangement is so made that the minimum deviation quantity is employed as an index of the degree of coincidence between the objective shape and the shape model. That is, a threshold value is set with respect to the minimum deviation quantity, and it is to be judged that the degree of coincidence of the objective shape with the shape model is low, so long as the minimum deviation quantity exceeds the threshold value.

Figure 20:
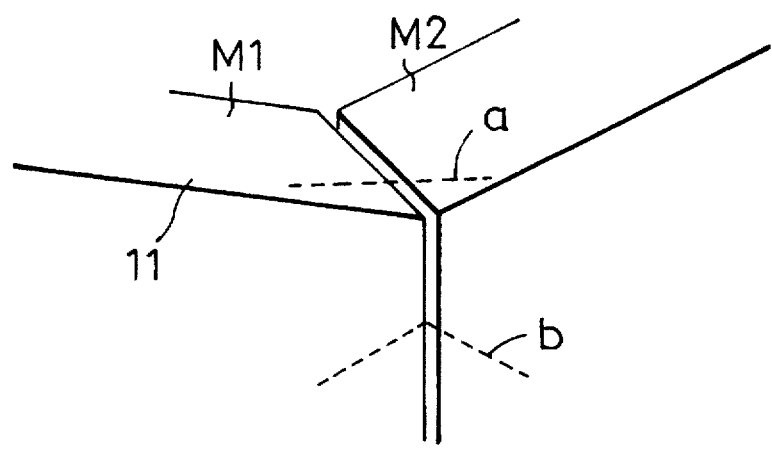
FIG. 20 shows in a fragmentary perspective view an example of application of another embodiment according to the present invention.
Figure 21A:
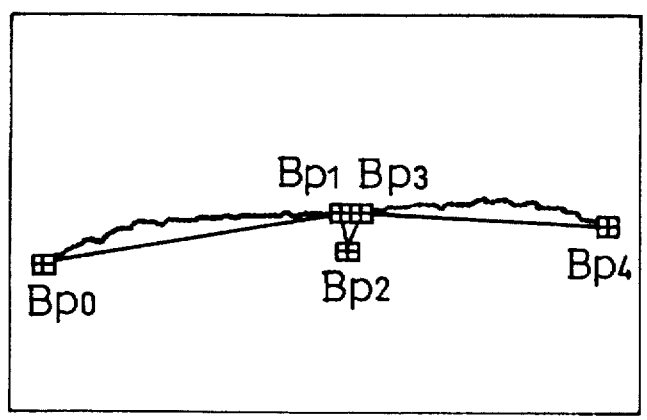
FIGS. 21a and 21b are diagrams for explaining the concept of processing steps in the embodiment of FIG. 20.
Figure 21B:
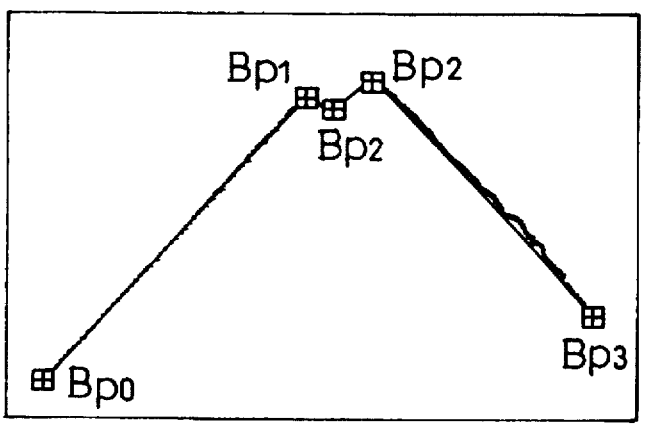
Figure 22:
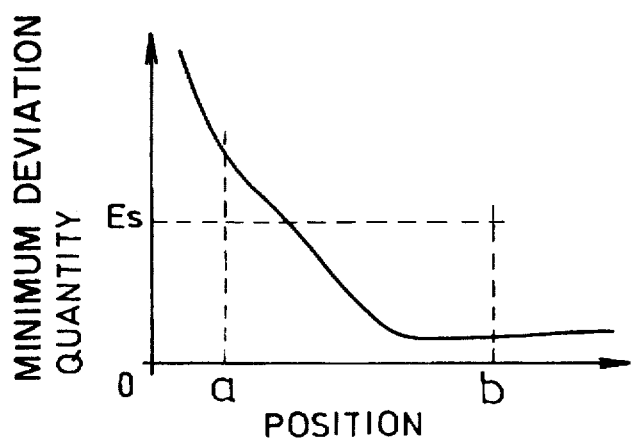
FIG. 22 is a diagram for explaining the embodiment of FIG. 20.

It is assumed that, as shown in FIG. 20, for example, the object 11 is a corner joint formed by welding a pair of plate members $M_1$ and $M_2$, and that the dot row S and the nodal points $B_{pi}$ obtained from the dot row S in the event where sectional lines are formed by the optical shearing at positions of dotted lines a and b in FIG. 20 are as shown respectively in FIGS. 21a and 21b. Here, upon collating with such shape model as in FIG. 9, the objective shape of FIG. 21b requires almost none of the deviation of the shape model, but the objective shape of FIG. 21a requires a remarkable deviation of the shape model. That is, the objective shape of FIG. 21a becomes remarkably large in the minimum deviation quantity in contrast to the objective shape of FIG. 21b. Thus, in an event where the corner joint of FIG. 20 is scanned vertically from upper side to lower side at the sectional lines by means of the optical shearing and the initial point of the corner joint is to be detected, it is possible to set a threshold value Es with respect to the minimum deviation quantity so that the initial position of the corner joint is judged at the time when the minimum deviation quantity becomes below the threshold value Es. Here, positions of a and b in FIG. 22 correspond to the positions of a and b in FIG. 20. When the threshold value Es is set to be high, a position closer to the position of a in FIG. 20 can be detected as the initial point of the corner joint and, if set to be low, a position remote from the a position of FIG. 20 can be detected as the initial point of the corner joint. For the threshold value Es, therefore, a value that allows the initial point of the corner joint to be properly detected on the basis of experimental result is to be determined. Other arrangements are the same as the embodiment of FIG. 2.

While the use of such minimum deviation quantity as in the embodiment of FIG. 20 allows the degree of coincidence in general between the objective shape and the shape model to be evaluated, the deviation quantity $E_{total}$ is being obtained as a weighted sum of the three type components, and there is a possibility that any local shape difference cannot be evaluated in strict manner.

Thus, in still another embodiment according to the present invention, the dimensional relationship of the object 11 is obtained as a result of the collation of the nodal points $p_i$ of the shape model with the nodal points $B_{pi}$ of the objective shape, as has been described with reference to FIGS. 3 and 4 with respect to the embodiment of FIG. 2. The arrangement is so made that the degree of coincidence between the shape model and the objective shape is evaluated by comparing at least part of numerical values denoting the positional relationship of the object 11 as an evaluation value with predetermined evaluation standard.

Figure 5:
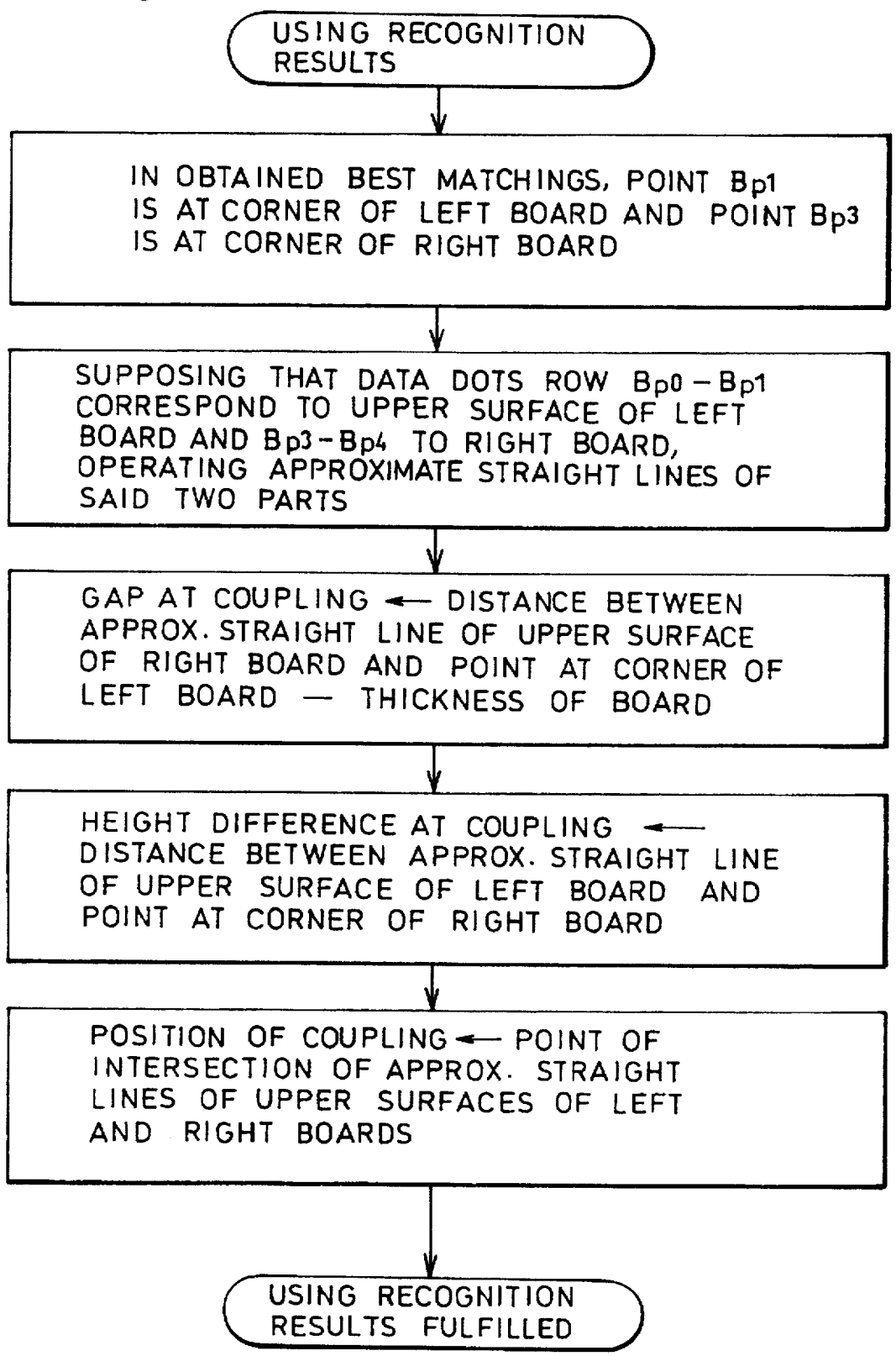
FIG. 5 shows in a flow chart the matching processing in the embodiment of FIG. 2.

Referring to a case where the welding is to be performed with the shape of the corner joint recognized, for example, the dimensions A and B obtained through the steps of FIG. 5 and shown in FIG. 4 are evaluated and, when the tolerance in which the welding can be performed for these dimensions A and B without any bad result is made known as a result of experiments to be:

$$A_{min} < A < A_{max}$$

$$B_{min} < B < B_{max}$$

it is possible to perform the evaluation of the degree of coincidence of the objective shape by means of the dimensions A and B, with the above tolerance used as an evaluation standard. According to this process, it is possible to evaluate strictly even to local shape differences, and the process is particularly useful in judging whether or not such practical work as the welding can be performed. That is, it is enabled to determine that the welding work is prohibited in the event where the dimensions A and B are departing from the tolerance.

Figure 23:
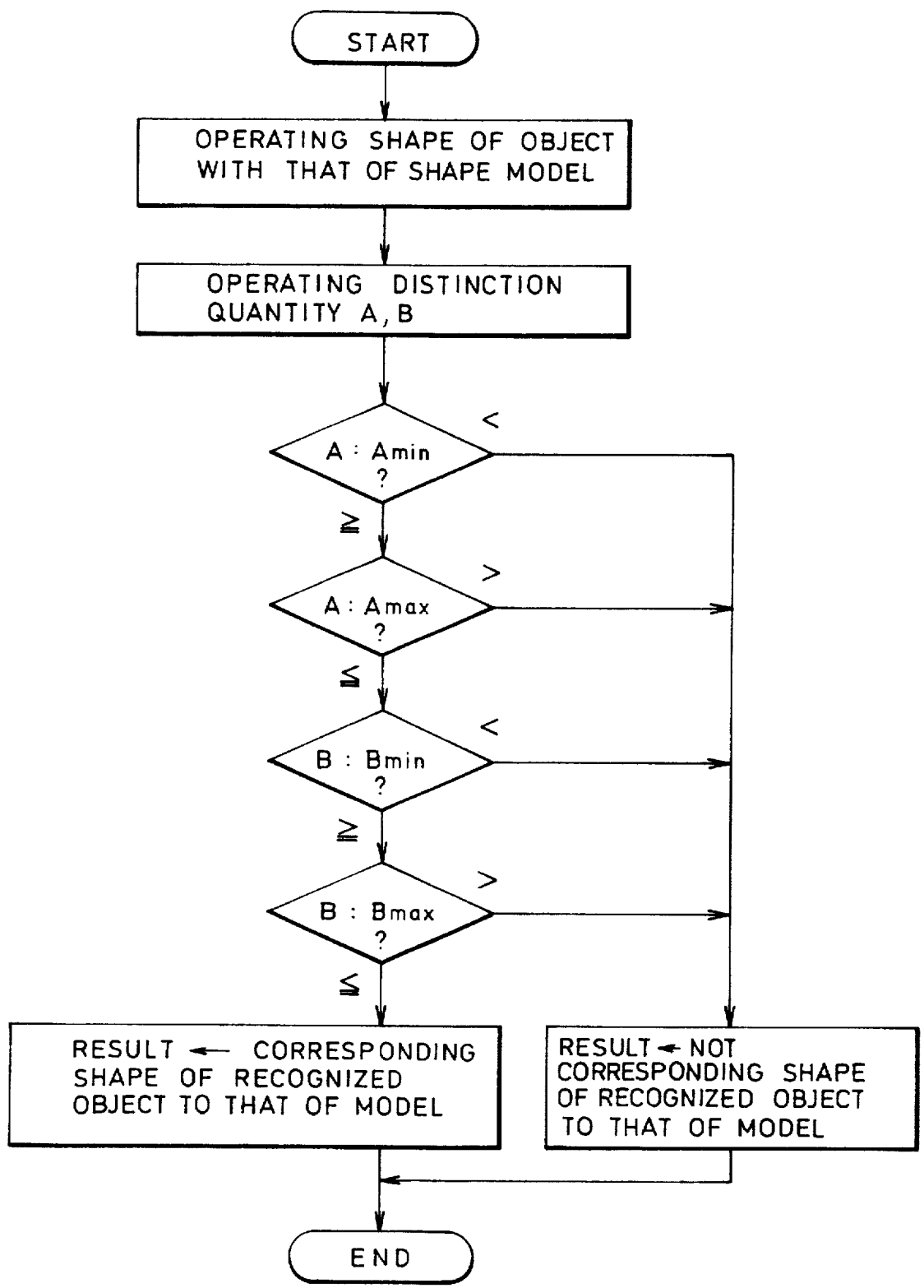
FIG. 23 is a flow chart for showing processing steps in still another embodiment according to the present invention.

The above steps may be summarized as in FIG. 23. That is, the objective shape is collated with the shape model, first, and the dimensions A and B which are to be the evaluation values are obtained on the basis of the result of the collation. Next, the dimensions A and B are evaluated as to whether or not they are within the tolerance, and it is judged that the objective shape and shape model are mutually not in conformity when the dimensions A and. B depart from even either one of the upper and lower limits of the tolerance. Other arrangements are the same as in the embodiment of FIG. 2.

Since in the process of the foregoing embodiment of FIG. 2 the deviation quantity $E_{total}$ is to be obtained with respect to all combinations for selecting the same number of the nodal points as those of the shape model with respect to the objective shape, it happens that required processing time increases in an event where the number of the nodal points contained in the objective shape is large. Accordingly, in another embodiment according to the present invention, a dynamic programming is used as a measure for restraining the increase in the processing time. That is, instead of optimizing all of the nodal points at one time as in the embodiment of FIG. 2, the optimizing is carried out stepwise so as to try to reduce the number of calculations. Now, as in FIG. 24, the collation is to be made in the dynamic programming with respect to the nodal points $P_0$ to $P_4$ of the shape model and the nodal points $B_{p0}$ to $B_{p8}$ of the objective shape.

Here, the value of $E_{total}$ which is to be the index of the degree of coincidence in the shape is a sum of values of evaluation function obtained with respect to every segment of the shape model, and the value of evaluation function with respect to a certain segment is determined irrespective of the matching of other segments (such characteristic of the evaluation function is regarded as Markov characteristic and is a condition for applying the dynamic programming), so that it is possible to sequentially optimize every segment with the dynamic programming employed.

Figure 24:
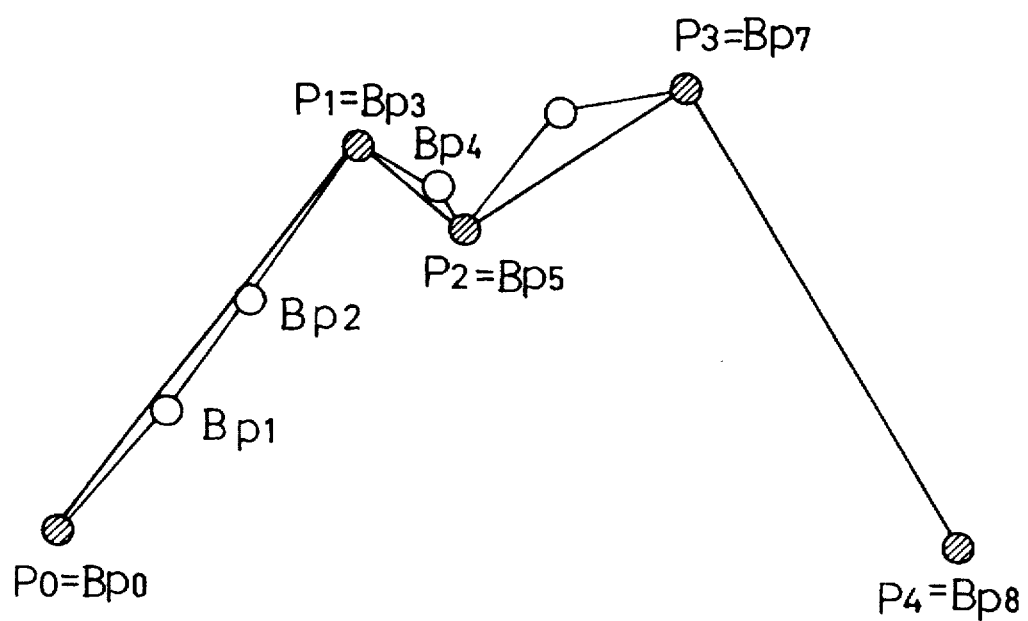
FIG. 24 is a diagram for explaining the concept of processing result of still another embodiment according to the present invention.
Figure 25A:
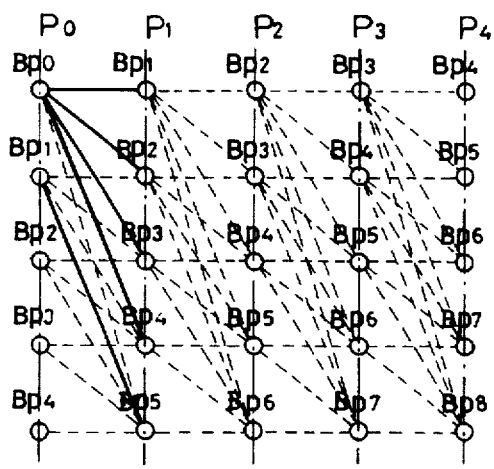
FIGS. 25a to 25d are diagrams for showing the concept of processing steps in the embodiment of FIG. 24.
Figure 25C:
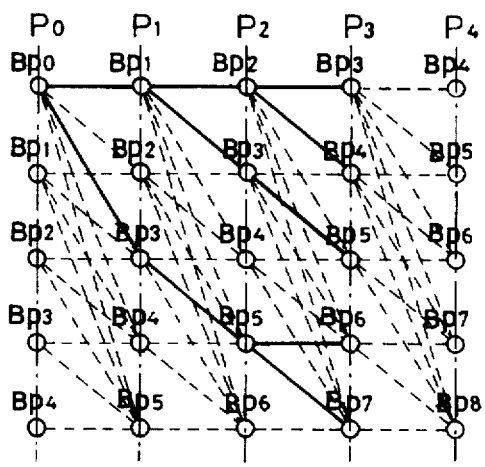
Figure 25B:
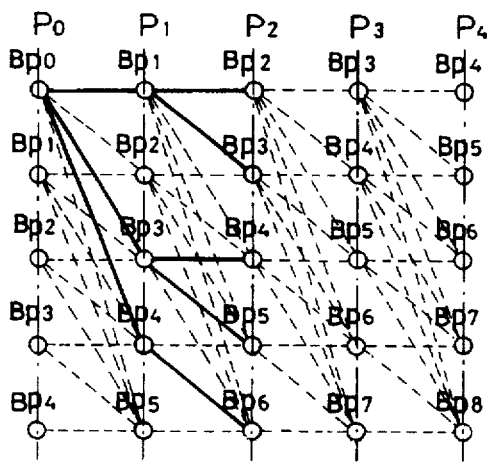
Figure 25D:
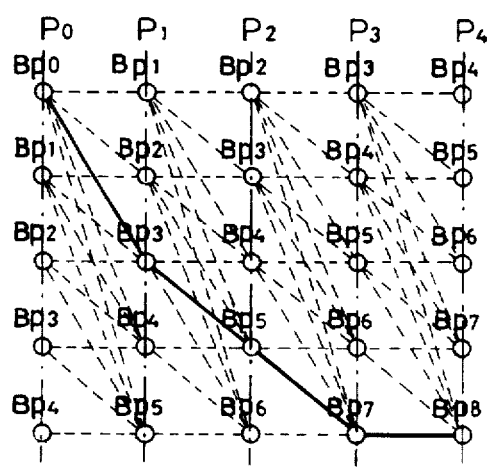
Figure 26:
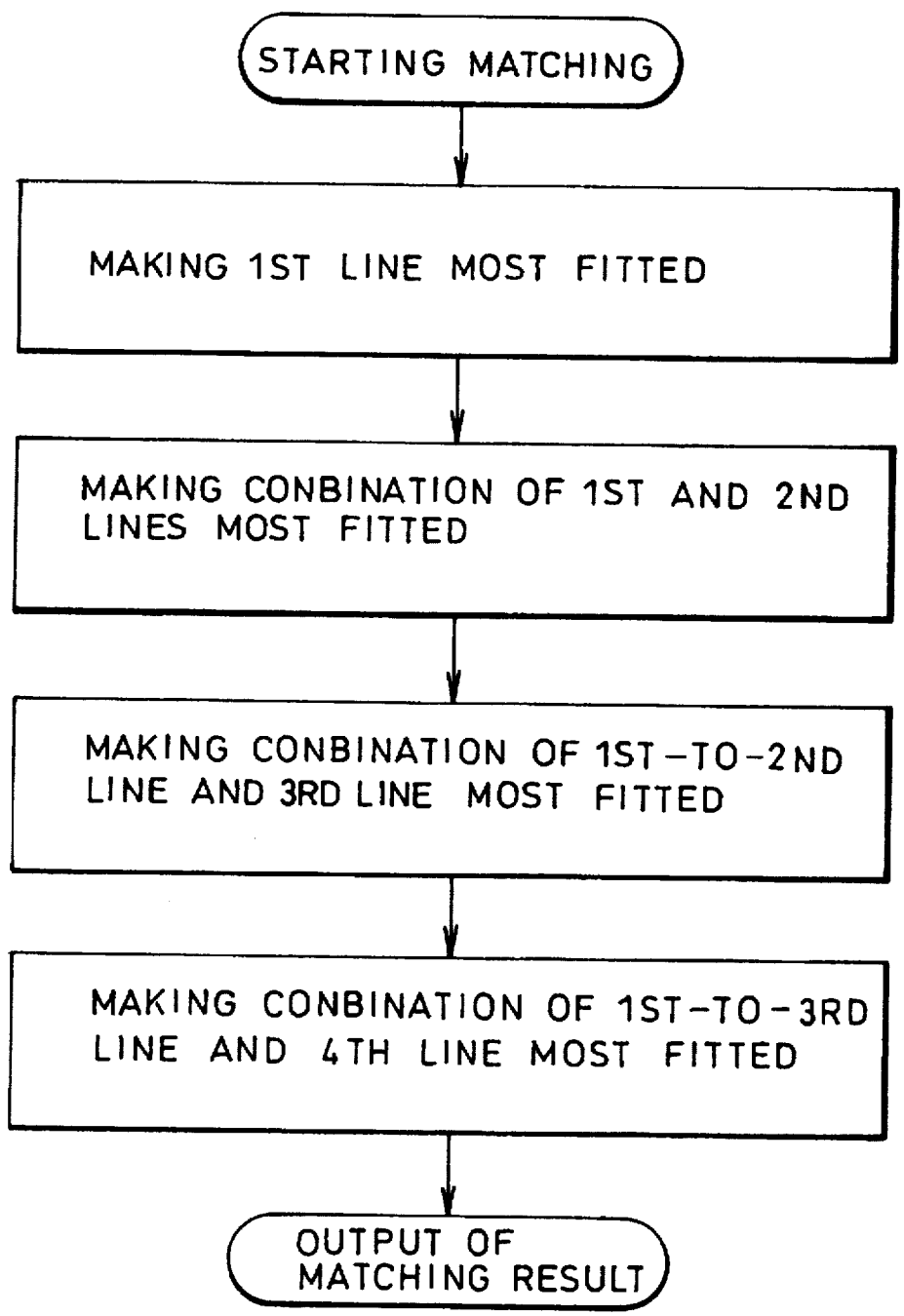
FIG. 26 is a flow chart showing the entire processing steps in the embodiment of FIG. 24.

Referring to the processing steps in the followings, the matching is first checked with respect to the segment between the nodal points $P_0$ and $P_1$. That is, as shown in FIG. 25a, in respective cases of bringing the nodal points $B_{p1}$ to $B_{p5}$ to conformity to the nodal point $P_1$ only one of possible selections of $P_0$ which allows a segment closest to the shape model is selected (this processing is evaluated by means of the evaluation function). When, for example, the nodal point $B_{p5}$ is brought into conformity to $P_1$ in FIG. 25a, the nodal point to be brought into conformity to $P_0$ is any one of the nodal points $B_{p0}$ to $B_{p4}$, and one which minimizes the evaluation function, that is, $B_{p1}$ is selected. With respect to other points $B_{p1}$ to $B_{p4}$ too, only one of the nodal points possible to be coincident to $P_0$ which minimizes the evaluation function is selected. Next, also with respect to $P_2$, the nodal point which minimizes the evaluation function is selected one by one from possible selections of the nodal points coinciding with $P_1$, with respect to each of the nodal points $B_{p2}$ to $B_{p6}$ coinciding with $P_2$. That is, the processing for selecting only one nodal point which coincides with $P_{i-1}$ with respect to each of the nodal points coinciding with $P_i (1 > i > 4)$ is sequentially performed, so that such selection which cannot be the optimization theoretically as that which, in FIG. 25a, brings the nodal points $B_{p2}$ to $B_{p4}$ to $P_0$ to $P_1$ will be excluded, and a combination of the nodal points $B_{p0}$-$B_{p3}$-$B_{p5}$-$B_{p7}$-$B_{p8}$ which is the highest in the degree of coincidence with the nodal points $P_0$ to $P_5$ of the shape model as shown in FIGS. 24 and 25d can be effectively obtained.

Figure 27:
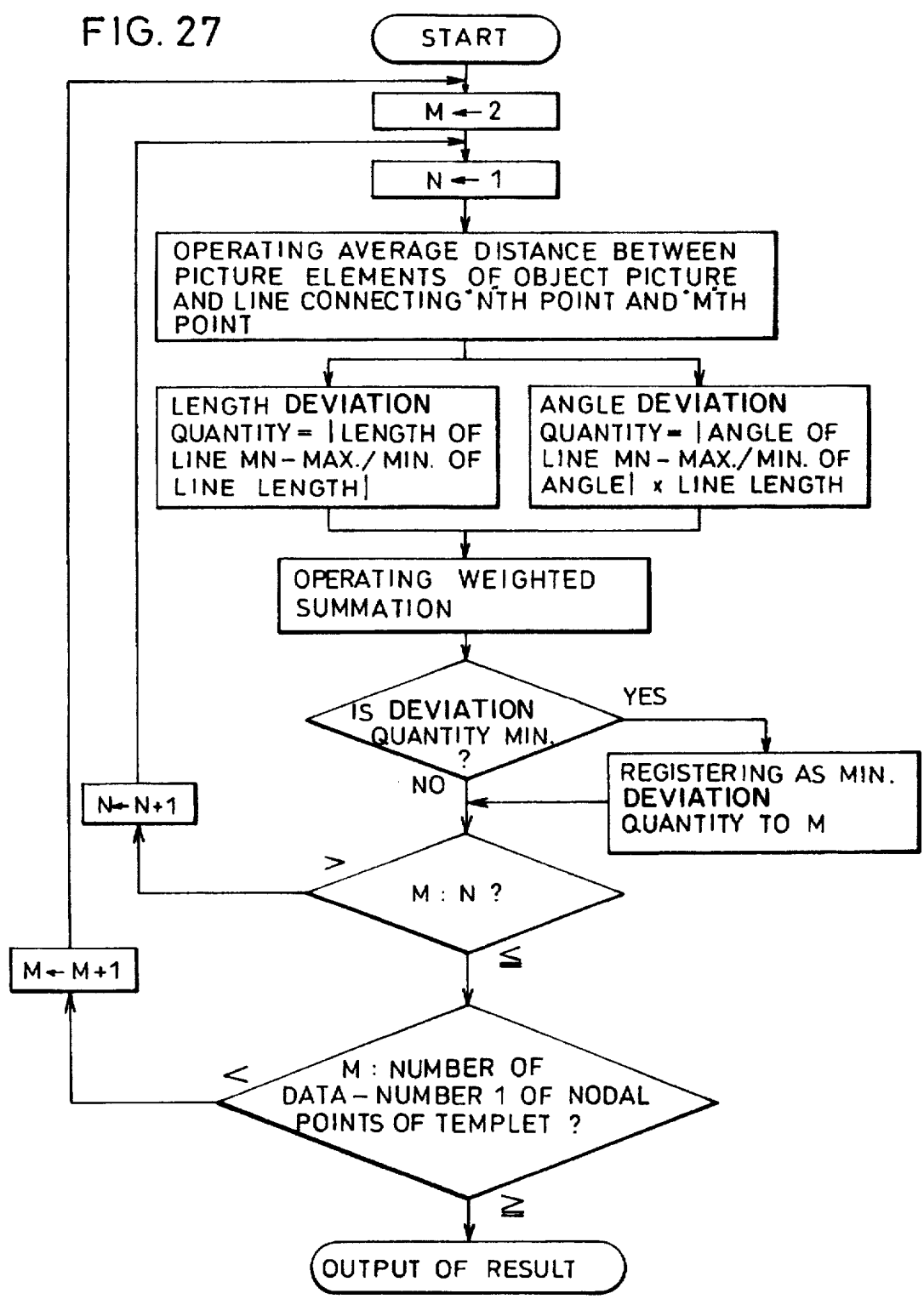
FIG. 27 is a flow chart showing the processing steps of the major part of the embodiment of FIG. 24.
Figure 28:
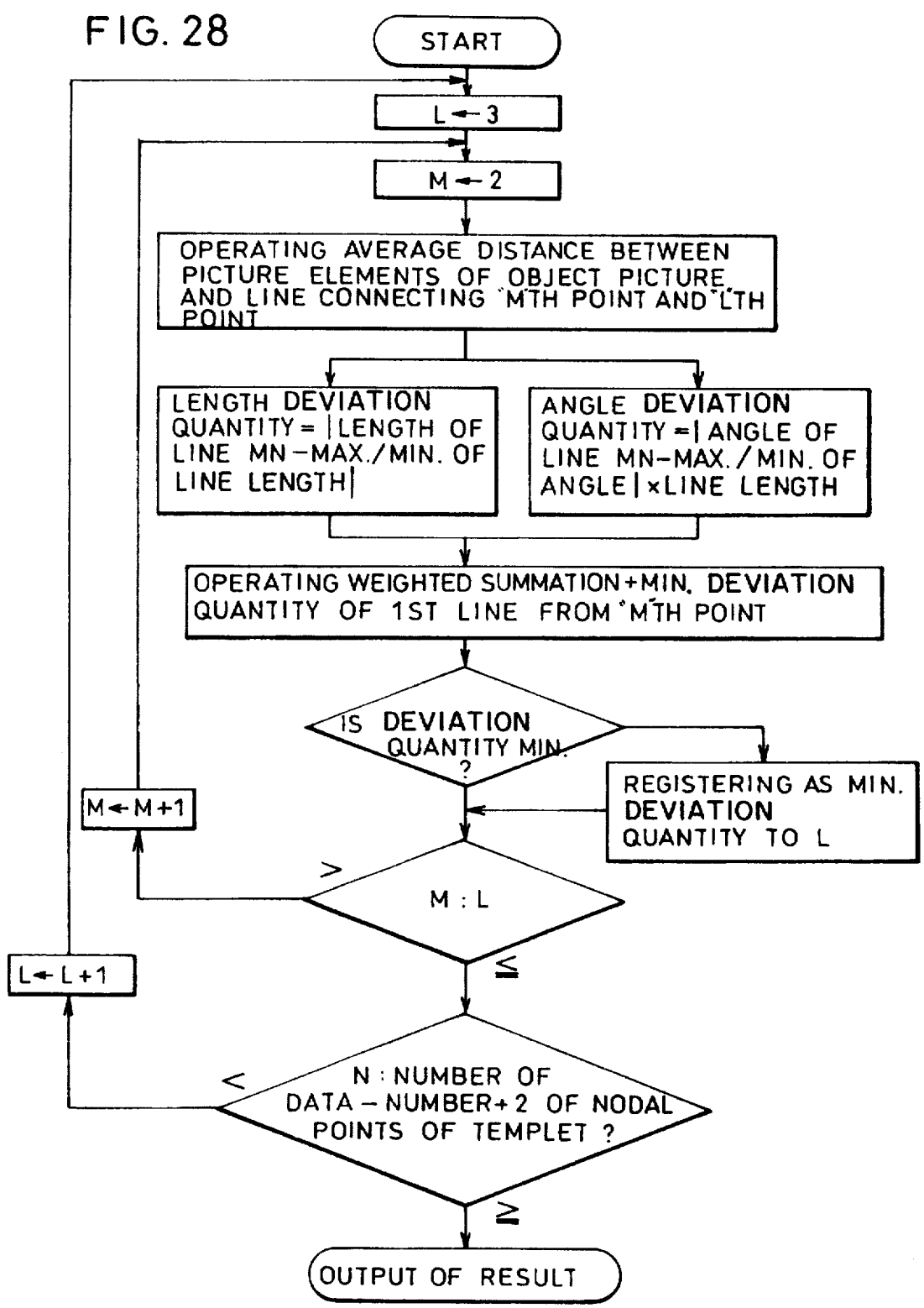
FIG. 28 is a flow chart showing the processing steps also at the major part of the embodiment of FIG. 24.

The evaluation of the degree of coincidence between the nodal points $P_0$ to $P_5$ and the nodal points $B_{p0}$ to $B_{p8}$ advances successively as has been described so as to optimize a combination of the first segment with second segment (segment $P_1P_2$), and an average value of the distance, length deviation component and gradient or angular deviation component of the segments of the objective shape and shape model are obtained, and the weighted sum as the deviation quantity is obtained. The nodal points $B_{p0}$ to $B_{p8}$ which render the deviation quantity to be the minimum are made as the nodal points being sought. FIGS. 27 and 28 show the optimization of the first segment and the combination of the first and second segments, respectively. With the foregoing matching processing executed, it is made possible to remarkably reduce the number of calculations and to practice a high speed processing. Other arrangements are the same as those in the embodiment of FIG. 2.

In still another embodiment according to the present invention, there is provided a measure for reducing the calculation amount in the matching processing by setting a threshold value with respect to the deviation quantity. That is, at the time when the deviation quantity obtained in the matching processing of the embodiment of FIG. 2 or the deformation quantity accumulated in the steps of the matching processing of the embodiment of FIG. 25 has exceeded a predetermined threshold, it is judged that a combination of the nodal points selected from the objective shape is not a combination coinciding with the nodal points of the shape model, the current calculation is stopped and a calculation of a next one of the nodal points is carried out. Since the operation is stopped in this way with respect to the combination of the nodal points found not adaptable during the operation of the deviation quantity, the number of calculations is reduced and the processing can be speeded up.

Here, the threshold value with respect to the deviation quantity is set to be a value as small as possible in light of a distribution of the deviation quantity obtained through past matching processings with respect to a plurality of the objective shapes. Further, in an event where a combination provides a deviation quantity smaller than the set threshold value, such deviation quantity may be employed as the threshold value in the matching processing. Alternatively, it may be also possible to set a limited range for the length and gradient of the shape model so that, when the length and gradient obtained from the objective shape in the course of the calculation of the deviation quantity upon selecting the nodal points from the objective shape exceeds the limited range, the calculation will be discontinued and the calculation of the deviation quantity may be executed with respect to the next selected nodal points. Other arrangements are the same as those in the embodiment of FIG. 2.

Figure 29A:
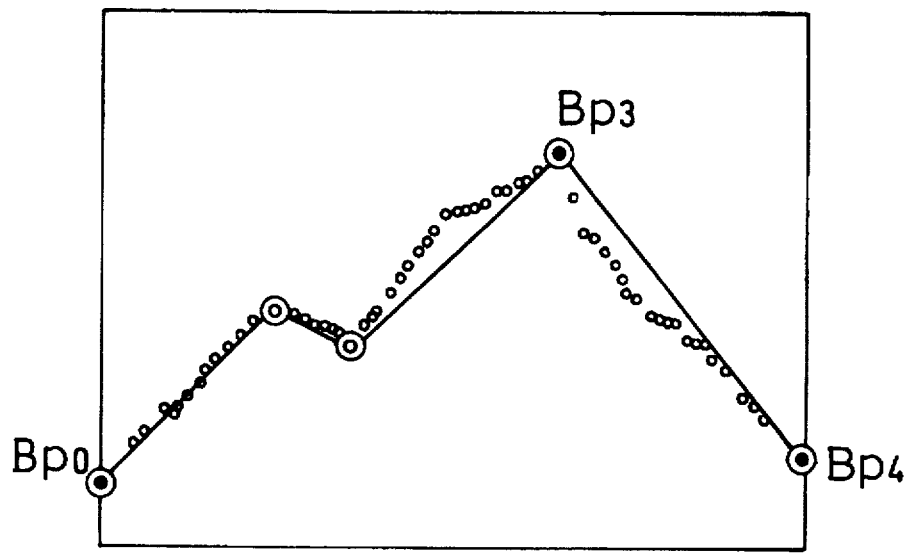
FIGS. 29a and 29b are explanatory diagrams for still another embodiment according to the present invention.
Figure 29B:
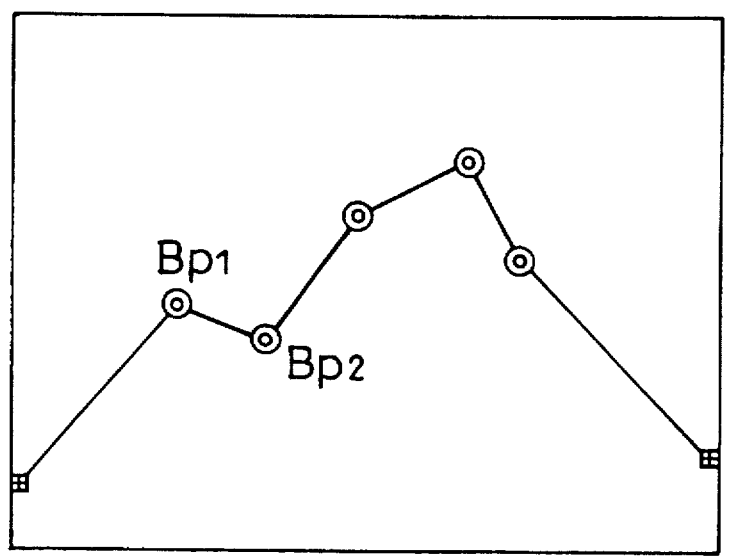

In a further embodiment of the present invention, there is taken a measure of using the knowledge relative to the shape model for reducing the calculation amount in the matching processing. When such knowledge with respect to the shape model shown, for example, in FIG. 9, that (1) "the nodal points $P_0$ and $P_4$ correspond to both side ends of data", (2) "the nodal point P3 is at the highest position", and (3) "the nodal point $P_0$ is always at a lower position than the nodal point $p_1$", it is possible to reduce the number of the combinations in selecting from the objective shape the nodal points corresponding to the nodal points of the shape model. With the knowledge (1) and (2) above utilized, it is possible to select such nodal points as $B_{p0}$, $B_{p3}$ and $B_{p4}$ as in FIG. 29a. Further, when the knowledge (3) is used, it becomes possible to render a range of selection of the nodal point $B_{p2}$ to be smaller with respect to the nodal point $B_{p1}$ in FIG. 29b. Other arrangements are the same as those in the embodiment of FIG. 2.

In still another embodiment of the present invention, a preferable setting process of the standard value and tolerance in the shape model is adopted, in which results of a plurality of past matchings are utilized, the average value of the length and gradient of the respective segments is utilized as the standard value, and the standard value±(predetermined value×standard deviation) are made to be the tolerance. By setting the standard value and tolerance as based on the past matching results in this way, it is possible to set an excellent shape model. Other arrangements are the same as those in the embodiment of FIG. 2.

In still another embodiment of the present invention, there is taken a measure of recognizing first a general shape of the object 11 and thereafter a local, detailed shape, in which, in executing the approximation processing with respect to the whole shape of the object 11, the whole shape is recognized by collating the objective shape obtained through a coarse approximation with the shape model representing the whole shape, and further the local, detailed shape is recognized by collating the objective shape obtained through a precise approximation with respect to a required part with a local shape model.

Figure 30A:
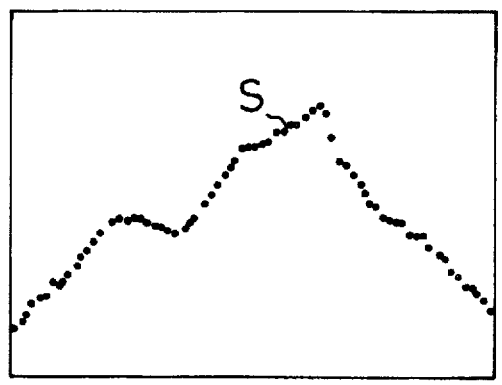
FIGS. 30a to 30e are explanatory views for another embodiment according to the present invention.
Figure 30B:
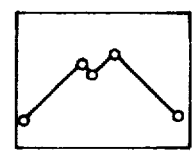
Figure 30C:
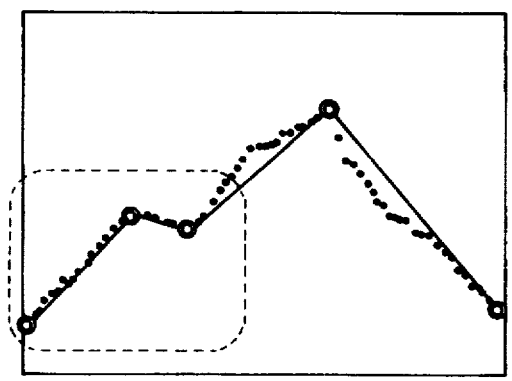
Figure 30D:
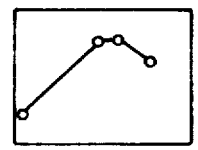
Figure 30E:
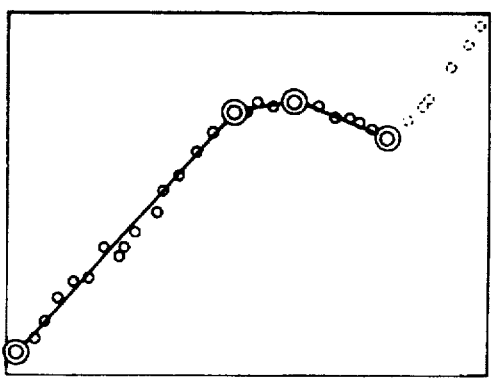

With respect to such dot row S as in FIG. 30a, a coarse approximation is carried out, and its matching processing with such shape model of generally M-shape as in FIG. 30b. Then, as shown in FIG. 30c, a precise approximation of the objective shape is carried out with respect to the dot row S between the nodal points $P_0$ and $P_2$ of the shape model, and the matching processing is to be performed by means of the shape model of such shape as in FIG. 30d. Through such processing, it is made possible to recognize such locally detailed shape as shown in FIG. 30e.

By employing such stepwise processing method, costs for the processing can be reduced in comparison with the recognition of detailed shape with respect to the whole shape of the object 11, while allowing the detailed shape at any required part to be recognized. Other arrangements are the same as those in the embodiment of FIG. 2.

While in the above embodiment of FIG. 30 the stepwise processing is employed, there is a possibility that the steps in the embodiment of FIG. 30 are not employable depending on the objective shape. Thus, with respect to at least one among the nodal points $B_{pi}$ obtained in a manner as in FIG. 31, the dots existing in a predetermined range adjacent to the nodal points $B_{pi}$ in the dot row S are successively selected as shown in FIG. 32a to be made respectively as the candidate nodal points $C_{pi}$, and the minimum deviation quantities at the time when the respective candidate nodal points $C_{pi}$ are employed as the nodal points are respectively obtained. When one candidate nodal point $C_{pi}$ the minimum deviation quantity of which is the smallest is found in this way, this candidate nodal point $C_{pi}$ is employed as a nodal point $B_{pi}$, in place of the nodal point $B_{pi}$, to have the matching processing with respect to the shape model performed.

Figure 31:
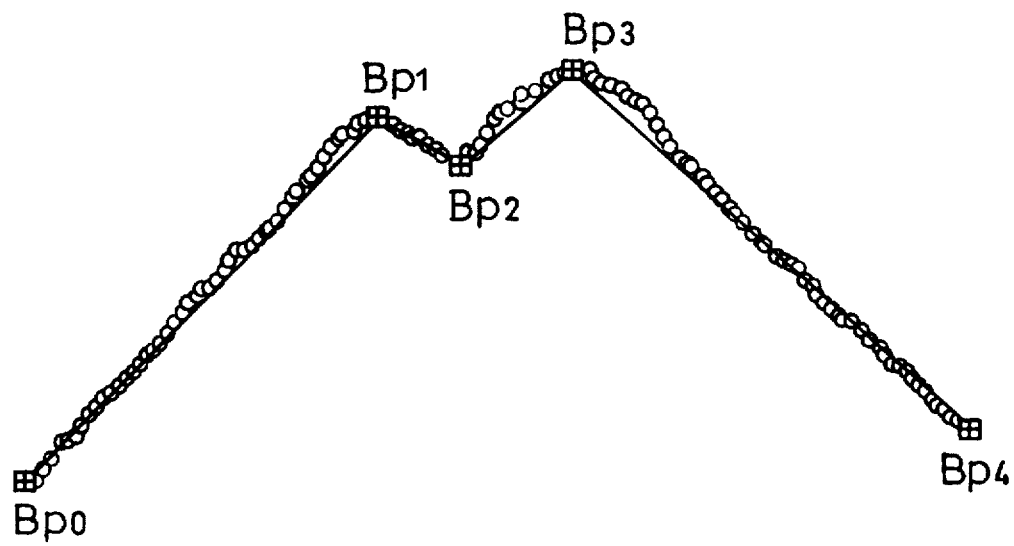
FIG. 31 and FIGS. 32a and 32b are diagrams for explaining the concept of processing steps in a further embodiment according to the present invention.
Figure 32A:
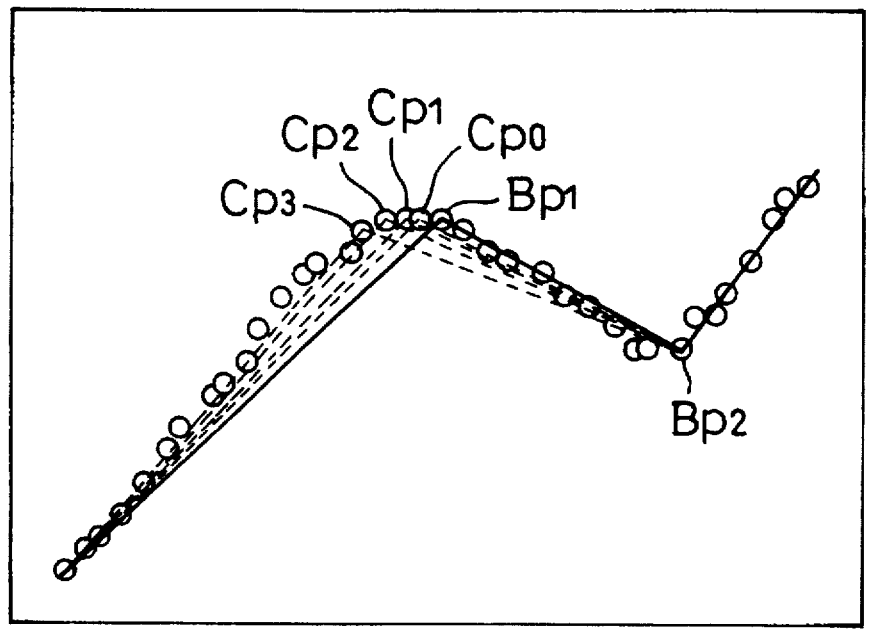
Figure 32B:
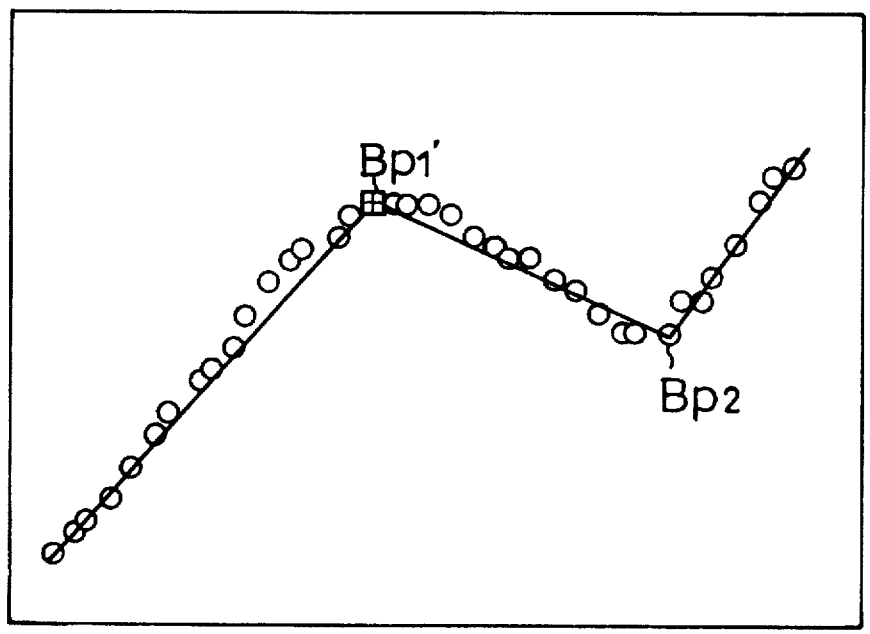
Figure 33:
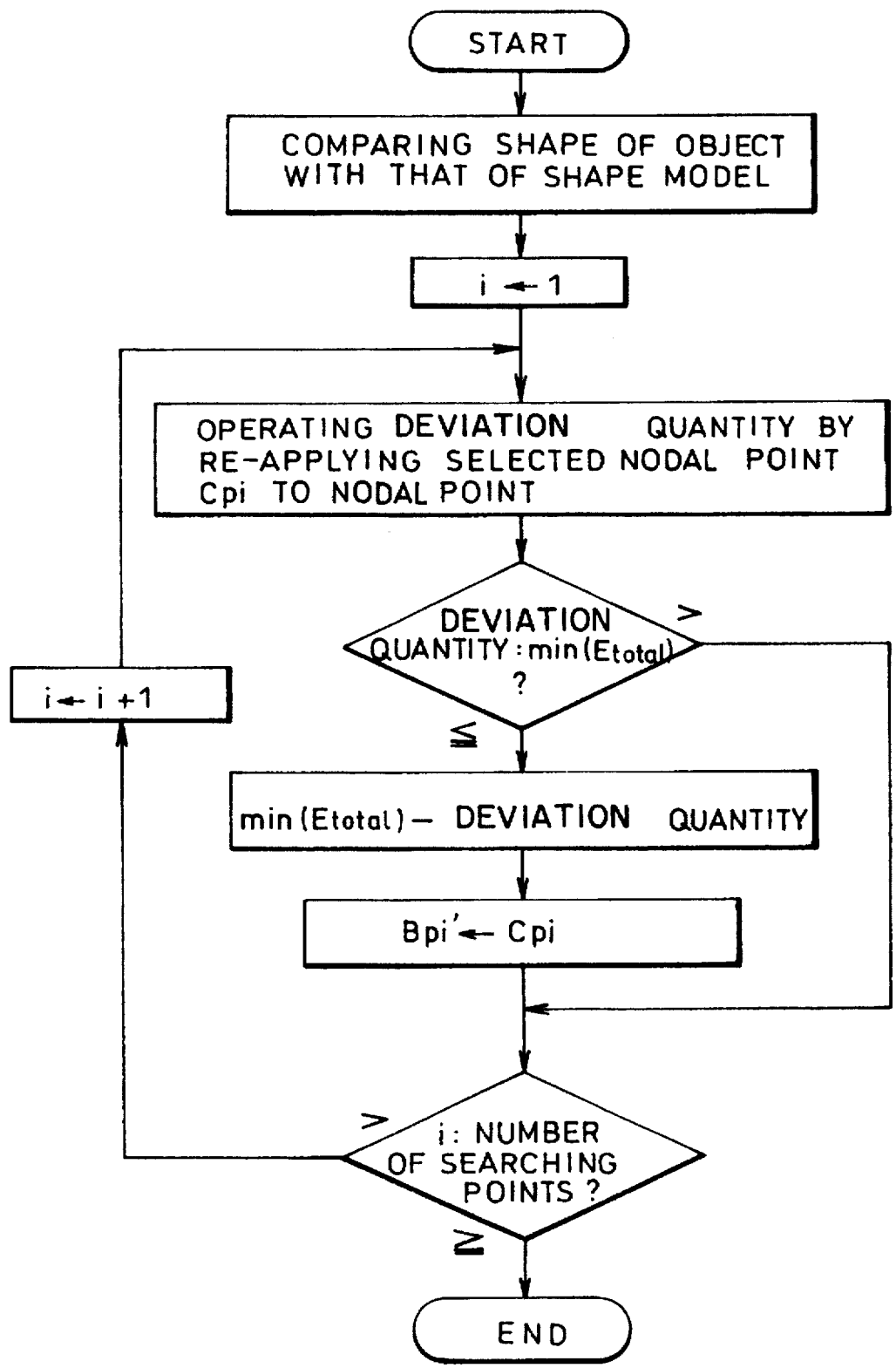
FIG. 33 is a flow chart showing the processing steps in the embodiment of FIGS. 31, 32a and 32b.

Since the nodal points $B_{pi}$ obtained through such polygonal line approximation by means of such tracing process as in the embodiment of FIG. 2 show a tendency of deviating in tracing direction with respect to the true angular position, the nodal point $B_{p1}$ shown in FIG. 31 is positioned as deviated in the tracing direction (rightward) from the true position. Thus, after performing once the matching processing with the obtained nodal point $B_{p1}$ employed, a predetermined number of dots in the dot row S disposed on the opposite side (left side) to the tracing direction as viewed from the nodal point B pl are selected as the candidate nodal points $C_{pi}$, and the deviation quantity $E_{total}$ at the time when the objective shape is collated as $B_{p0}$-$C_{pi}$-$B_{p2}$-$B_{p3}$-$B_{p4}$ with the shape model is to be calculated. Through this operation, if there is the candidate nodal point $C_{pi}$ the deviation quantity $E_{total}$ of which becomes smaller than in the case when the nodal point $B_{p1}$ is selected, this candidate nodal point $C_{pi}$ is employed as a new nodal point $B_{pi}'$, and the candidate nodal point $C_{pi}$ the deformation quantity $E_{total}$ of which is the smallest is employed as the nodal point $B_{pi}'$. Through such processing, it is made possible to select more precise nodal points $B_{pi}$ for the objective shape. The particular steps may be summarized as in FIG. 33. Other arrangements are the same as in the embodiment of FIG. 2.

Figure 34A:
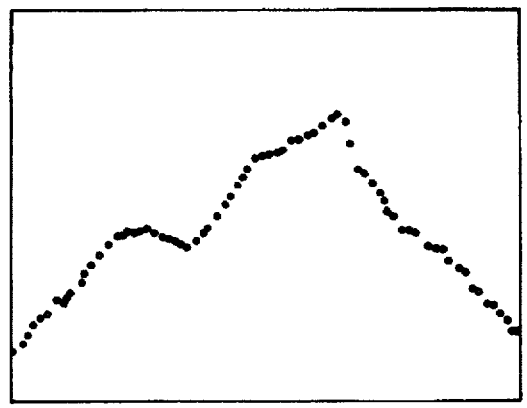
FIGS. 34a to 34c are explanatory diagrams for still another embodiment according to the present invention.
Figure 34B:
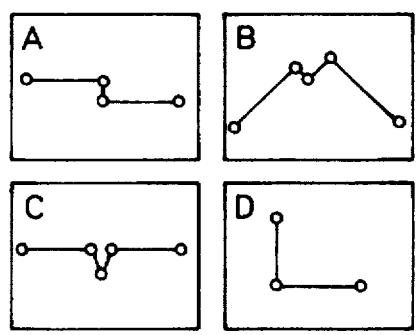

In still another embodiment according to the present invention, there is taken a measure of recognizing individually a plurality of the objects 11 respectively of different shapes, in which, as in FIG. 34b, a plurality of types of the shape model for the collation with the objective shape obtained from the objects 11 are prepared, one shape model showing the minimum deviation quantity is selected from these shape models, and it is made possible to have the optimum shape model fitted even where the plurality of objects of recognition are mixedly present.

Figure 34C:
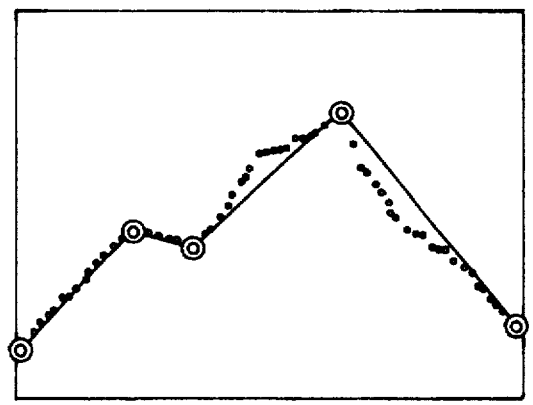

That is, in FIG. 34b, the shape models are shown as A for lap joint, B for the corner joint, C for butt joint and D for T joint, and the dot row S shown in FIG. 34a is subjected to the matching processing with respect to the respective shape models. Here, the shape model whose deviation quantity is the minimum is selected from among the shape models of the four different types and the dot row S, and it is possible to realize the recognition with the optimum shape model or models. Thus, as shown in FIG. 34c, the shape model B for the corner joint is selected as seen in FIG. 34c, and the type of the joint can be discriminated by means of an information as to which one of the shape models has been selected. Consequently, such application that a single welding robot can cope with the welding of a plurality of different types can be realized. Other arrangements are the same as in the embodiment of FIG. 2.

In the embodiment described with reference to FIG. 34, it is likely that required processing time is prolonged due to the application of a plurality of types of the shape model to the single objective shape. Thus, in still another embodiment according to the present invention, there is taken a measure in which the order of priority is set for the respective shape models. The matching processing is performed according to the order of priority of the shape models with respect to the objective shape. The selection of the shape model is stopped at the time when the current deviation quantity E total has become below the preliminarily set threshold value, and the shape model at that time is made to be the one for the collation with the objective shape.

When the appearing frequency of the four shape models shown in FIG. 34 is high in the order of A, B, C and D, for example, the respective shape models are collated in this order with the objective shape shown in FIG. 34a, a threshold value is set for the deviation quantity at the time of the collation, and the minimum deviation quantity obtained for every shape model is compared with the threshold value.

Depending on the result of this comparison, the matching processing is carried out with the shape model showing the minimum deviation quantity to be below the threshold value employed as the optimum shape model while, in an event where the minimum deviation quantity compared with respect to all shape models is not below the threshold value, the last selected shape model is employed.

In the example of FIG. 34, the minimum deviation quantity is the smallest when the shape model of B is employed, so that, when the threshold value is set to be a value slightly larger than a prospective value of the minimum deviation quantity with respect to the shape model of B, it is made possible to employ the shape model B without selecting other shape models. In this case, it is not required to perform the matching processing nor to obtain the minimum deviation quantity with respect to the shape models C and D, and the required processing time is to be shortened.

The present embodiment is particularly effective in an event when the shape models are clearly different. Further, in an event where the objective shape is successively input in time series and the probability of generation of the objective shape corresponding to the respective types of the shape model is biased, the order of priority of the shape models is determined in the light of the results of past collations, then the required number of selections for the respective shape models can be reduced and a shortening of the processing time can be realized. Other arrangements are the same as in the embodiment of FIG. 2.

Figure 38:
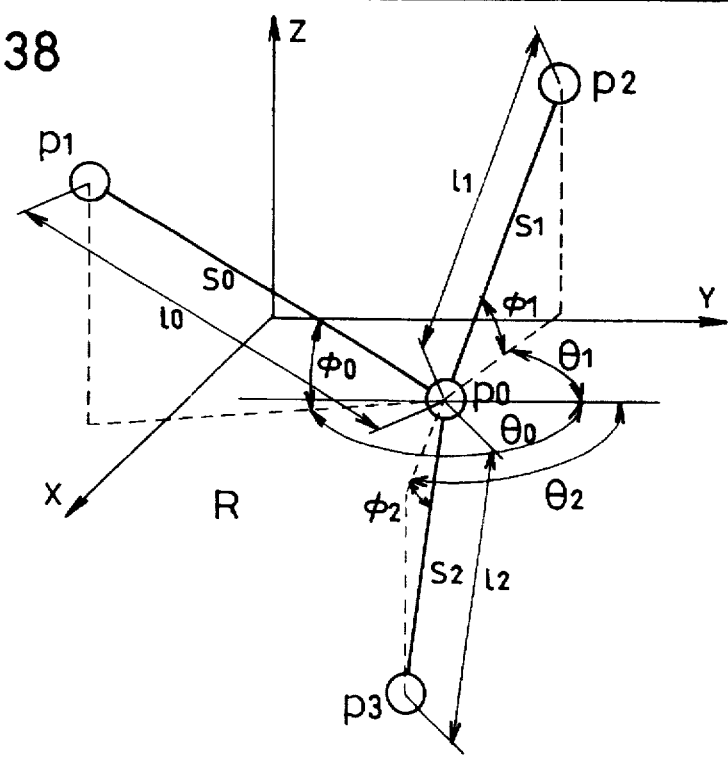
FIG. 38 is a diagram showing an example of the shape model used in another embodiment according to the present invention.
Figure 37:
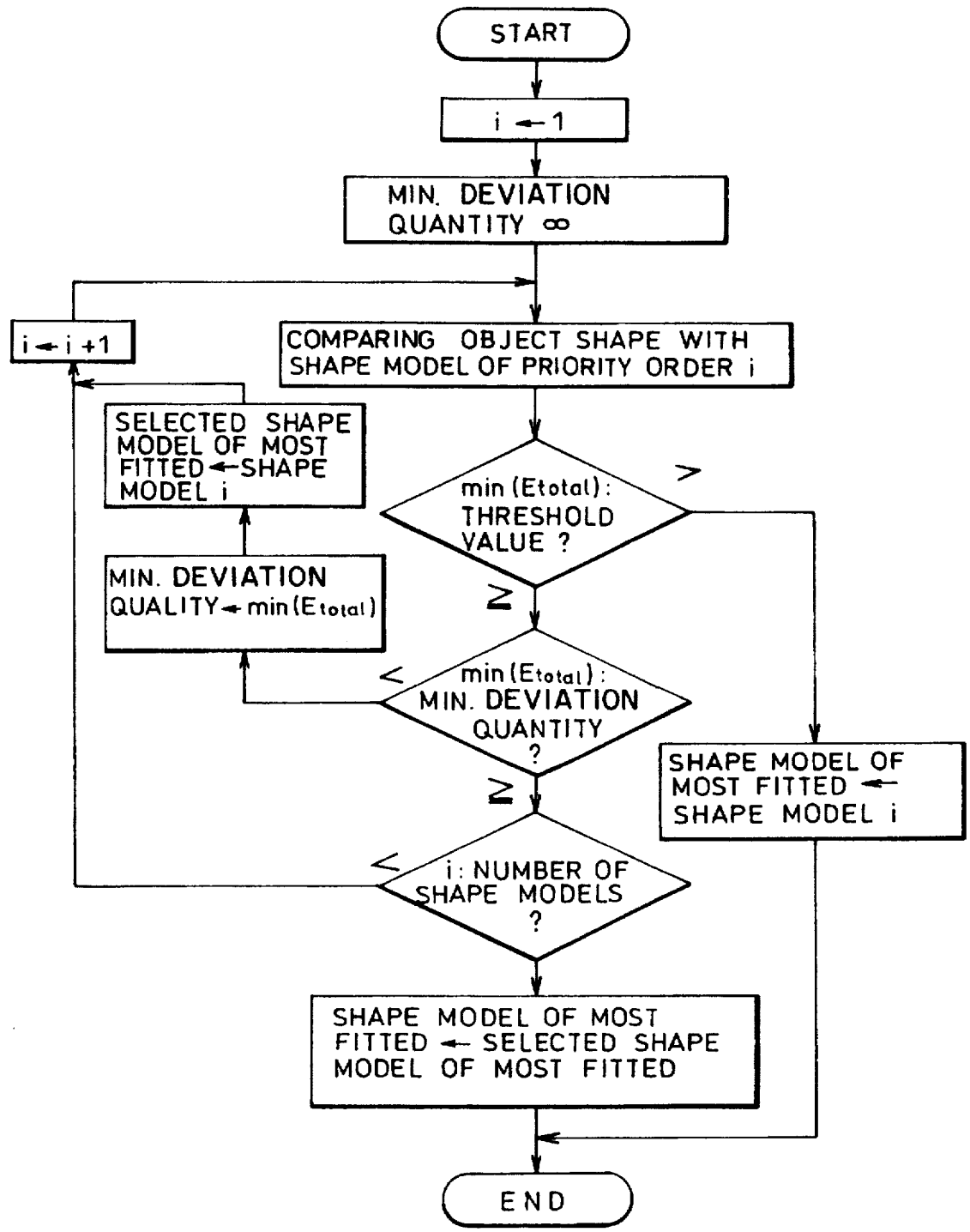
FIG. 37 is a flow chart showing processing steps in still another embodiment according to the present invention.

While in the respective foregoing embodiments the collation between the objective shape and the shape model in the two dimensional plane is executed, a further embodiment according to the present invention provides an expanded measure in which the collation is performed between the objective shape and the shape model in three dimensional space. That is, the expansion to three dimensional space is carried out basically by increasing the type of the feature to be collated. In the present embodiment, as shown in FIG. 38, a reference plane R (XY plane in the drawing) is set within a three dimensional space, and gradients $\theta_k$ (k=0 to 2) with respect to Y-axis of projections on the reference plane R of respective segments $s_k$ (k=0 to 2) connecting between the nodal points $P_k$(k=0 to 3), gradients $\phi_k$(k=0 to 2) of the respective segments $s_k$ with respect to the reference plane R and the length $1_k$(k=0 to 2) of the respective segments $s_k$ (k=0 to 2) are used as the features. Further, likewise the feature in the two dimensional plane, the tolerances $[1_{mink}, 1_{maxk}]$, $[\theta_{mink}, O_{maxk}]$ and $[\phi_{mink}, \phi_{maxk}]$ as well as the standard values $1_{stk}, \theta_{stk}$ and $\phi_{stk}$ are set. It is needless to say that the standard values $1_{stk}, \theta_{stk}$ and $\phi_{stk}$ have the following relationship:

$$1_{mink} < 1_{stk} < 1_{maxk}$$

$$\theta_{mink} < \theta_{stk} < \theta_{maxk}$$

$$\phi_{mink} < \phi_{stk} < \phi_{maxk}$$

Figure 39A:
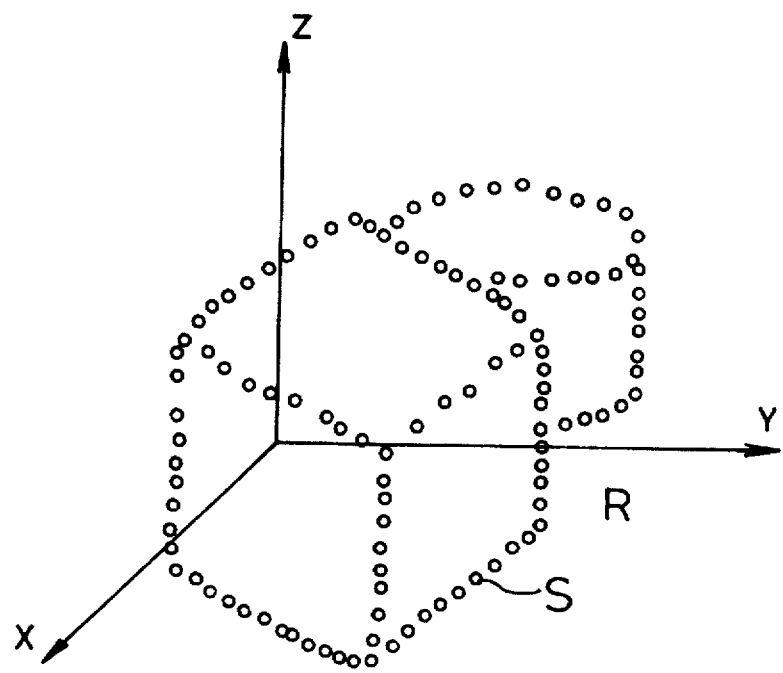
FIGS. 39a and 39b are diagrams showing the concept of processing steps in the embodiment of FIG. 38.
Figure 39B:
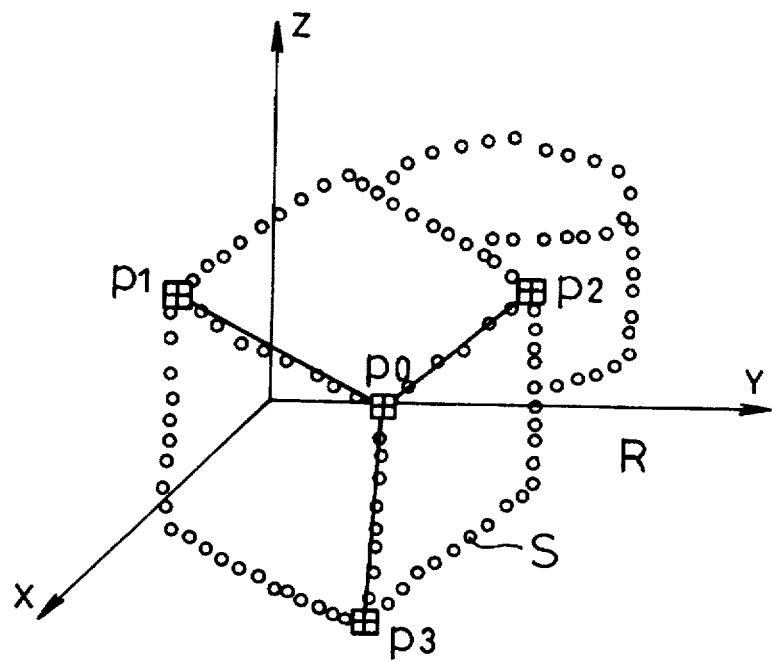

By increasing the types of the feature as in the foregoing, it is made possible to perform the collation between the objective shape and the shape model with respect to the dot row S present in the three dimensional space. Here, as the measure for acquiring the three dimensional information with respect to the dot row S, it is possible to employ, other than such optical shearing as in the embodiment of FIG. 2, a stereotelevision which obtains the three dimensional information on the basis of parallel relationships between a plurality of the image pick-up means 13. With such collation enabled in the three dimensional space, it is made possible to recognize, for example, a corner portion of the object 11 of a rectangular parallelepiped shape, when such dot row S as shown in FIG. 39a with respect to the object 11 of the rectangular parallelepiped or columnar shape. That is, by defining, as in FIG. 39b, one corner of the rectangular parallelepiped object 11 as the shape model to be a nodal point $p_0$, other three adjacent corners to the above corner to be nodal points $p_1$, to $p_3$ and three segments connecting the nodal point $p_0$ to the other nodal points $p_1$ to $p_3$ to be line elements $s_0$ to $s_2$, it is made possible to recognize the corner portion corresponding to the nodal point $p_0$.

Even in such case of the collation carried out in the three dimensional space as in the present embodiment, it is possible to employ a partial ellipse as a line element $s_k$ in the same manner as in the embodiment of FIG. 11, while the major axis and flatness may be used as the length $1_k$ of the line segment $s_k$ and, as the gradient $\theta_k$ of the projection of the line segment $s_k$ on the reference place R and the gradient $\phi_k$ of the line segment $s_k$ with respect to the reference plane R, the gradient of a projection of the major or minor axis on the reference plane R and a gradient of the major or minor axis with respect to the reference plane R may be employed. Other arrangements are the same as in the embodiment of FIG. 2.

While in the respective foregoing embodiments it has been assumed that the coordinates in the pictures of the objective shape and shape model are substantially in conformity, the objective shape is to be subjected to a parallel shift or a rotary shift with respect to the shape model depending on the position of the object 11. In the case of a parallel shift, the length $1_k$ and gradient $\theta_k$ of the line segment $s_k$ do not vary, and the objective shape can be collated with the shape model only by the parallel shift but, in the case of the rotary shift, the amount of rotational shifting of a reference line cannot be specified and the gradient $\theta_k$ of the line element cannot be obtained. That is, when the objective shape has a rotary shift with respect to the shape model, it happens that the collation between the objective shape and the shape model is difficult even when the foregoing feature is employed.

Figure 40:
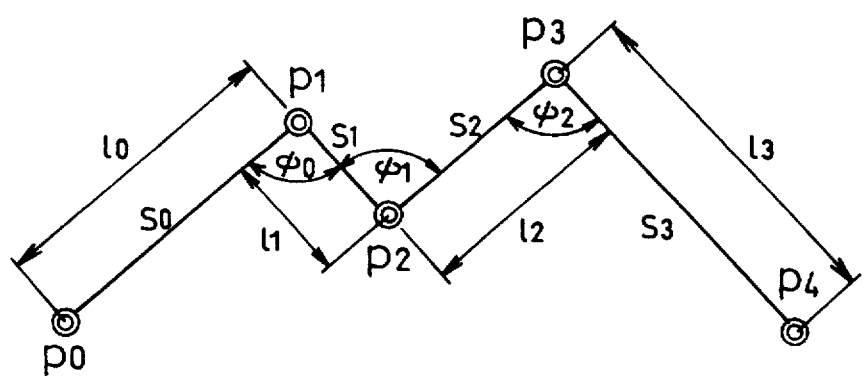
FIG. 40 is a diagram showing an example of the shape model in still another embodiment according to the present invention.

In still another embodiment according to the present invention, there is taken a measure for eliminating such problem, in which, as shown in FIG. 40, an angle $O_k$ (k=0 to 2) defined by a pair of the adjacent line segments s is employed as the feature. Since this $s_k$ angle $\phi_k$ never varies even if the objective shape is subjected to the rotary shift, it becomes possible to collate the objective shape with the shape model. Here, for the feature, the tolerance [$1_{mink}$, $1_{maxk}$] and [$\phi_{mink}$, $\phi_{maxk}$] as well as the standard values $1_{stk}$ and $\phi_{stk}$ are in such relationship as follows:

$$1_{mink} < 1_{stk} < 1_{maxk}$$

$$\phi_{mink} < \phi_{stk} < \phi_{maxk}$$

Figure 41:
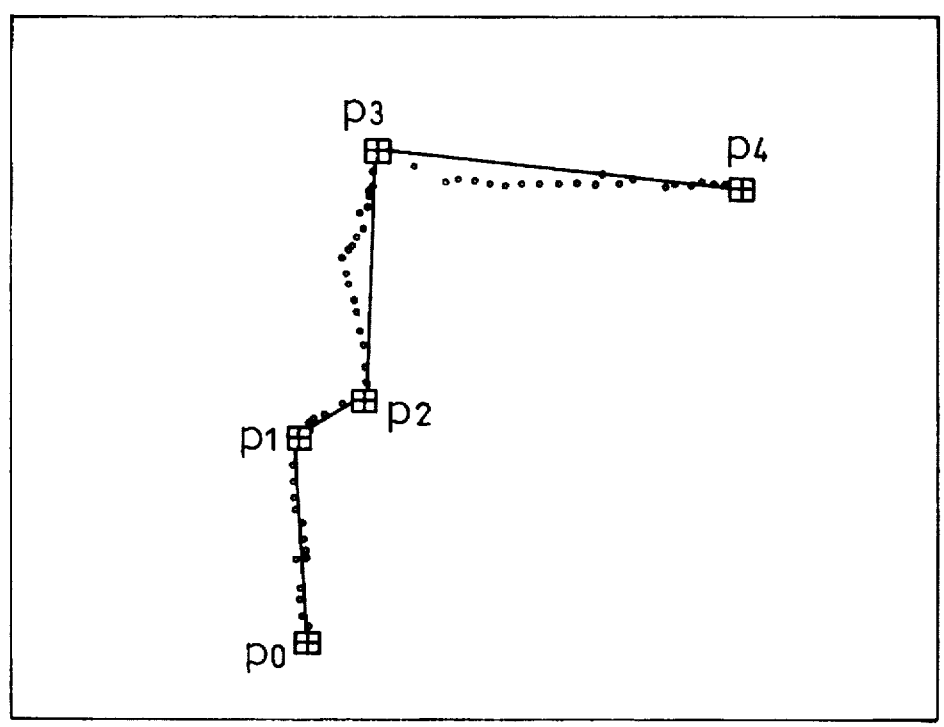
FIG. 41 is a diagram showing the concept of processing steps in the embodiment of FIG. 40.

By employing as the feature the length $1_k$ of the line element $s_k$ and the angle $\phi_k$ as the relative positional relationship, any reference line is made unnecessary, and any restriction due to the directivity of the objective shape can be removed. That is, as in FIG. 41, the collation is made possible even when the objective shape is in the rotary shift with respect to the shape model. Here, the angle $\phi_k$ may be obtained as a difference in the gradient $\theta_k$ of the pair of the line segments $s_k$. That is, the angle $\phi_k$ with respect to the pair of the line segments $s_i$ and $s_j$ may be made to be $\phi_k = |\theta_i - \theta_j|$. In this case, the directivity is required for defining the gradient $\theta_k$, and it is useful to take, for example, the reference line and parallel line on right side of the nodal point $P_k$ in obtaining the gradient $\theta_k$ with respect to the line segment $s_k$, to take the gradient $\theta_k$ only in clockwise direction from this parallel line and to provide a code so that the gradient $\theta_k$ will be positive in the clockwise direction but negative in the counterclockwise direction.

Figure 42:
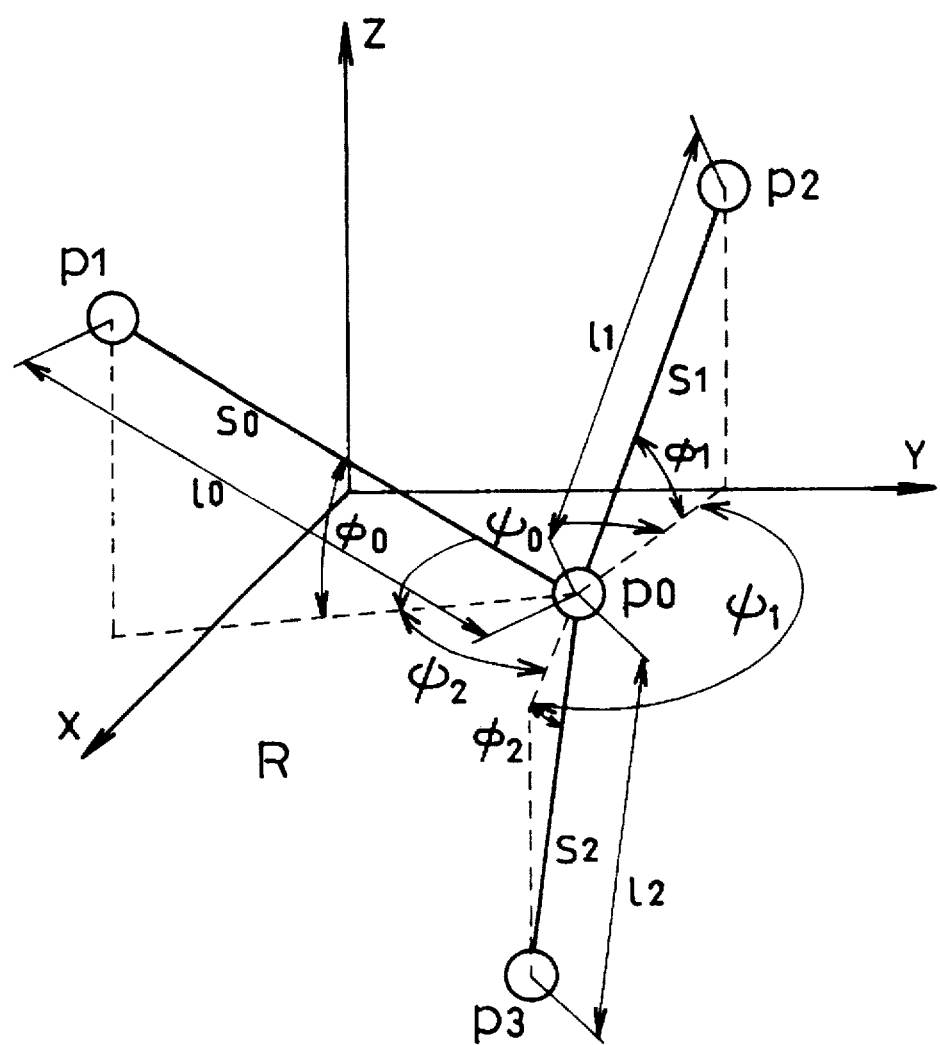
FIG. 42 is a diagram showing another example of the shape model in the embodiment of FIG. 40.

The technical idea of this embodiment is applicable to such collation in the three dimensional space as described in the embodiment of FIG. 38, in which idea the shape model is represented, instead of the gradient $\theta_k$ of the projected straight line of the respective line segments $s_k$ on the reference plane (XY plane), by the angle $\phi_k$ defined by a pair of straight lines adjacent to each other on both sides of the nodal point $P_0$, and, instead of the gradient $\phi_k$ of the respective line segments $s_k$ with respect to the reference plane R, by a difference $\delta_k$ in the gradient $\phi_k$ between each pair of the line segments $s_k$. That is, the difference $\delta_k$ in the gradient $\phi_i$ and $\phi_j$ of the two line elements $s_i$ and $s_j$ can be obtained as $\delta_k = \phi_i$ and $\phi_j$, except for that, in obtaining the difference $\delta k$, the gradient $\phi_k$ is provided with a negative code when the line segment $s_k$ is on the negative side with respect to the reference plane R. In an example shown in FIG. 42, for example, the line segment $s_3$ connecting between the nodal points $p_0$ and $p_3$ is positioned on the negative side with respect to the $\phi_3$ is reference plane R, and its gradient $\phi_3$ is of the negative code so that, when the difference $\delta_3$ from the gradient $\phi_1$ of the line element $s_1$ positioned on the positive side with respect to the reference plane R, the relationship.

$$\delta_3 = |\phi_3 - \phi_1| = |\phi_1 + |\phi_3||$$

is to be satisfied.

For the respective feature, the tolerance [$1_{mink}$, $1_{maxk}$], [$\phi_{mink}$, $\phi_{maxk}$] and [$\delta_{mink}$, $\delta_{maxk}$] and the standard values $1_{stk}$, $\phi_{stk}$ and $\delta_{stk}$ are set, which standard values are in the following relationship, similarly to other embodiments:

$$1_{mink} < 1_{stk} < 1_{maxk}$$

$$\phi_{mink} < \phi_{stk} < \phi_{maxk}$$

$$\delta_{mink} \; \delta_{stk} < \delta_{maxk}$$

Other arrangements are the same as those in the embodiment of FIG. 2. In the steps of the present embodiment, on the other hand, an event where the rotary shift of the objective shape is required to be detected (where the rotation must be detected as being no good or abnormal, and so on) does not allow the process of the present embodiment to be employed, and it is then required to use the shape model employing the gradient $\theta_k$ and $\phi_k$. Thus, by employing the differences $\phi_k$ and $\delta_k$ of the gradients $\theta_k$ and $\phi_k$, it is made possible to have as the data both of the gradients $\theta_k$ and $\phi_k$ and their differences $\phi_k$ and $\delta_k$, and it is possible to perform the collation of the objective shape with the shape model by selecting the data depending on whether or not the detection of the rotary shift is required.

What is claimed is:

1. In a process of recognizing an object by comparing an objective shape representative of said object with a shape model of the object, the process comprising the steps of:

A) representing a known shape model in a two dimensional plane as a plurality of first nodal points and a plurality of line segments interconnecting respective pairs of said first nodal points, each line segment including a length characteristic and gradient characteristic;

B) establishing standard values for the length and gradient characteristics, respectively, of each line segment;

C) establishing tolerance ranges for the length and gradient characteristics, respectively, of each line segment;

D) representing said object as a plurality of separate objective shapes each comprised of a row of dots disposed on a two-dimensional plane and having the same number of nodal points as said shape model, said row comprised of a plurality of second nodal points and a plurality of dot segments interconnecting respective pairs of said second nodal points, E) separately evaluating each objective shape determined from step D by:
E1) determining an average spacing of all dots of said dot row from said line segments of said shape model,
E2) comparing lengths of said dot segments to said tolerance ranges of respective line segment lengths, to determine a length deviation of each dot segment outside of said tolerance range therefor, and summing said length deviations of all dot segments to establish a length deviation sum,
E3) comparing gradients of said dot segments to said tolerance ranges of respective line segment gradients, to determine a gradient deviation of each dot segment outside of said tolerance range therefor, and summing said gradient deviations of all dot segments to establish a gradient deviation sum,
E4) summing values of said average spacing, said length deviation sum, and said gradient deviation sum for defining a deviation quantity total, and
E5) selecting the objective shape having a lowest deviation quantity total for comparison with the shape model.

2. In a process of recognizing an object by comparing an objective shape representative of said object with a shape model of the object, the process comprising the steps of:

A) representing a known shape model in a two dimensional plane as a plurality of first nodal points and a plurality of line segments interconnecting respective pairs of said first nodal points, each line segment including a length characteristic and gradient characteristic;

B) establishing standard values for the length and gradient characteristics, respectively, of each line segment;

C) establishing tolerance ranges for the length and gradient characteristics, respectively, of each line segment;

D) representing said object as a plurality of separate objective shapes each comprised of a row of dots disposed on a two-dimensional plane and having the same number of nodal points as said shape model, said row comprised of a plurality of second nodal points and a plurality of dot segments interconnecting respective pairs of said second nodal points, E) separately evaluating each objective shape determined from step D by:
E1) determining an average spacing of all dots of said dot row from said line segments of said shape model,
E2) comparing lengths of said dot segments to said standard values therefor, to determine a length deviation of each dot segment outside of said standard values, and summing said length deviations of all dot segments to establish a length deviation sum,
E3) comparing gradients of said dot segments to said standard values therefor, to determine a gradient deviation of each dot segment outside of such standard values, and summing said gradient deviations of all dot segments to determine a gradient deviation sum,
E4) summing values of said average spacing, said length deviation sum, and said gradient deviation sum for defining a deviation quantity total, and
F) selecting the objective shape having the lowest deviation quantity total for comparison with the shape model determined from step E4.

3. The process according to claim 1, wherein step E4 further comprises providing respective weighted values for said average spacing, said length deviation sum, and said gradient deviation sum.

4. The processing according to claim 2, wherein step E4 further comprises providing respective weighted values for said average spacing, said length deviation sum, and said gradient deviation sum.

5. The process according to claim 1, wherein step D further comprises subjecting said row of dots to a polygonal line approximation step which defines said dot segments as respective straight lines whose points of intersection define said nodal points, step E2 comprising comparing lengths of said straight lines to said tolerance ranges of said respective line segment lengths, and step E3 comprises comparing gradients of said straight lines to said tolerance ranges of said respective line segment gradients.

6. The process according to claim 2, wherein step D further comprises subjecting said row of dots to a polygonal line approximation step which defines said dot segments as respective straight lines whose points of intersection define said nodal points, step E2 comprising comparing lengths of said straight lines to said tolerance ranges of said respective line segment lengths, and step E3 comprises comparing gradients of said straight lines to said tolerance ranges of said respective line segment gradients.

7. The process according to claim 1, wherein step D comprises subjecting said row of dots to a polygonal line approximation step which defines said dot segments as respective straight lines whose points of intersection define said nodal points; and selecting candidate nodal points when the number of nodal points of an objective shape is less than the number of nodal points of the shape model, said candidate nodal points comprising all nodal points disposed within a predetermined range adjacent to a selected nodal point, the candidate nodal point having a minimum deviation quantity total being selected as a nodal point for comparison with the shape model.

8. The process according to claim 2, wherein step D comprises subjecting said row of dots to a polygonal line approximation step which defines said dot segments as respective straight lines whose points of intersection define said nodal points; and selecting candidate nodal points when the number of nodal points of an objective shape is less than the number of nodal points of the shape model, said candidate nodal points comprising all nodal points disposed within a predetermined range adjacent to a selected nodal point, the candidate nodal point having a minimum deviation quantity total being selected as a nodal point for comparison with the shape model.

9. The process according to claim 1, wherein step D further comprises subjecting said row of dots to a Hough transformation to establish a Hough curve.

10. The process according to claim 2, wherein step D further comprises subjecting said row of dots to a Hough transformation to establish a Hough curve.

11. The process according to claim 1, wherein step D further comprises subjecting said row of dots to a polygonal line approximation step which defines said dot segments as respective straight lines whose points of intersection define said nodal points; and further comprising the steps of selecting candidate nodal points when the number of nodal points of the objective shape is less than the number of nodal points in the shape model, said candidate nodal points comprising a dot in said dot row located between a pair of adjacent nodal points which possess a maximum distance from a straight line extending between said pair of adjacent nodal points, the candidate nodal point having the smallest said distance being selected as a nodal point for comparison with said objective shape.

12. The process according to claim 2, wherein step D further comprises subjecting said row of dots to a polygonal line approximation step which defines said dot segments as respective straight lines whose points of intersection define said nodal points; and further comprising the steps of selecting candidate nodal points when the number of nodal points of the objective shape is less than the number of nodal points in the shape model, said candidate nodal points comprising a dot in said dot row located between a pair of adjacent nodal points which possess a maximum distance from a straight line extending between said pair of adjacent nodal points, the candidate nodal point having the smallest said distance being selected as a nodal point for comparison with said objective shape.

13. The process according to claim 1, wherein step D includes performing an interpolation to fill a vacancy of one or more dots in the dot arrow.

14. The process according to claim 2, wherein step D includes performing an interpolation to fill a vacancy of one or more dots in the dot arrow.

15. The process according to claim 1, wherein respective segments of the shape model are compared with respective segments of the objective shape.

16. The process according to claim 2, wherein respective segments of the shape model are compared with respective segments of the objective shape.

17. The process according to claim 1, wherein the shape recognition is repeated with said tolerance of said feature for the shape model automatically altered on the basis of previous comparisons.

18. The process according to claim 2, wherein the shape recognition is repeated with said tolerance of said feature for the shape model automatically altered on the basis of previous comparisons.

19. The process according to claim 1, further including the step of comparing the objective shape selected in step F, with said shape model by a dynamic programming step.

20. The process according to claim 2, further including the step of comparing the objective shape selected in step F, with said shape model by a dynamic programming step.

21. The process according to claim 1, wherein steps A through E4 are performed for each of a plurality of sections of said object, step E4 comprising establishing a threshold value with respect to said deformation quantity total, whereby when the deviation quantity total being calculated in step E4 for a given section exceeds the threshold value, the calculation for the given section is stopped, and the calculation of deviation quantity total for the next section is initiated.

22. The process according to claim 2, wherein steps A through E4 are performed for each of a plurality of sections of said object, step E4 comprising establishing a threshold value with respect to said deformation quantity total, whereby when the deviation quantity total being calculated in step E4 for a given section exceeds the threshold value, the calculation for the given section is stopped, and the calculation of deviation quantity total for the next section is initiated.

23. The process according to claim 1, wherein the nodal points are selected from the dot row of the objective shape with the knowledge relative to at least one nodal point of the shape model.

24. The process according to claim 2, wherein the nodal points are selected from the dot row of the objective shape with the knowledge relative to at least one nodal point of the shape model.

25. The process according to claim 1, wherein a limited range is set for the shape model so that, when the deviation quantity total exceeds this limited range during step E4, this calculation of the deviation quantity is stopped, and the deviation quantity for next selection is calculated.

26. The process according to claim 2, wherein a limited range is set for the shape model so that, when the deviation quantity total exceeds this limited range during step E4, this calculation of the deviation quantity is stopped, and the deviation quantity for next selection is calculated.

27. The process according to claim 1, wherein after comparing a whole shape of the objective shape with the whole shape model, a portion of the objective shape is compared with a corresponding portion of the shape model.

28. The process according to claim 2, wherein after comparing a whole shape of the objective shape with the whole shape model, a portion of the objective shape is compared with a corresponding portion of the shape model.

29. The process according to claim 1, wherein a threshold value is provided with respect to the minimum value of the deviation quantity total so that, when the minimum value of the deformation quantity is larger than said threshold value, a degree of coincidence of the objective shape with the shape model is concluded to be low.

30. The process according to claim 2, wherein a threshold value is provided with respect to a minimum value of the deviation quantity total so that, when the minimum value of the deformation quantity is larger than said threshold value, a degree of coincidence of the objective shape with the shape model is concluded to be low.

31. The process according to claim 1, wherein the degree of coincidence of the objective shape with respect to the shape model is judged through a comparison of a positional relationship of at least two of the nodal points of the objective shape with a preliminarily set evaluation standard.

32. The process according to claim 2, wherein a degree of coincidence of the objective shape with respect to the shape model is judged through a comparison of a positional relationship of at least two of the nodal points of the objective shape with a preliminarily set evaluation standard.

33. The process according to claim 1, wherein a plurality of shape models of mutually different shapes are provided, the shape models being respectively compared with the objective shape selected in step F, and the shape model having a minimum deviation quantity total is selected as the shape model coinciding with the objective shape.

34. The process according to claim 2, wherein a plurality of shape models of mutually different shapes are provided, the shape models being respectively compared with the objective shape selected in step F, and the shape model having a minimum deviation quantity total is selected as the shape model coinciding with the objective shape.

35. The process according to claim 1, wherein a plurality of shape models of mutually different shapes is provided, the respective shape models are compared with the objective shape in a pre-set order, and a first one of the respective shape models whose deviation quantity total is below a pre-set threshold value is selected as the shape model coinciding with the objective shape.

36. The process according to claim 2, wherein a plurality of shape models of mutually different shapes is provided, the respective shape models are compared with the objective shape in a pre-set order, and a first one of the respective shape models whose deviation quantity total is below a pre-set threshold value is selected as the shape model coinciding with the objective shape.

* * * * *